(12) United States Patent
Sheu et al.

(10) Patent No.: US 11,250,240 B1
(45) Date of Patent: Feb. 15, 2022

(54) INSTANCE SEGMENTATION USING SENSOR DATA HAVING DIFFERENT DIMENSIONALITIES

(71) Applicant: Pony AI Inc., Grand Cayman (KY)

(72) Inventors: Kevin Sheu, Fremont, CA (US); Jie Mao, Santa Clara, CA (US)

(73) Assignee: Pony AI Inc., Grand Cayman (KY)

( * ) Notice: Subject to any disclaimer, the term of this patent is extended or adjusted under 35 U.S.C. 154(b) by 10 days.

(21) Appl. No.: 16/939,546

(22) Filed: Jul. 27, 2020

(51) Int. Cl.
*G06K 9/00* (2006.01)
*G06K 9/62* (2006.01)
*G01S 17/931* (2020.01)
*G01S 17/894* (2020.01)
*G06K 9/46* (2006.01)

(52) U.S. Cl.
CPC ........ *G06K 9/00208* (2013.01); *G01S 17/894* (2020.01); *G01S 17/931* (2020.01); *G06K 9/4642* (2013.01); *G06K 9/6257* (2013.01); *G06K 9/6262* (2013.01); *G06K 9/6289* (2013.01)

(58) Field of Classification Search
CPC ............. G06K 9/00208; G06K 9/6262; G06K 9/6289; G06K 9/4642; G06K 9/6257; G01S 17/931; G01S 17/894
See application file for complete search history.

(56) References Cited

U.S. PATENT DOCUMENTS

| | | | |
|---|---|---|---|
| 8,928,753 B2 | 1/2015 | Han | |
| 10,650,278 B1* | 5/2020 | Ho | ............ G06K 9/34 |
| 2014/0139676 A1 | 5/2014 | Wierich | |
| 2016/0014406 A1 | 1/2016 | Takahashi | |
| 2021/0063578 A1* | 3/2021 | Wekel | ............ G01S 7/481 |

* cited by examiner

*Primary Examiner* — Casey L Kretzer
(74) *Attorney, Agent, or Firm* — Sheppard Mullin Richter & Hampton LLP

(57) ABSTRACT

Described herein are systems, methods, and non-transitory computer readable media for using 3D point cloud data such as that captured by a LiDAR as ground truth data for training an instance segmentation deep learning model. 3D point cloud data captured by a LiDAR can be projected on a 2D image captured by a camera and provided as input to a 2D instance segmentation model. 2D sparse instance segmentation masks may be generated from the 2D image with the projected 3D data points. These 2D sparse masks can be used to propagate loss during training of the model. Generation and use of the 2D image data with the projected 3D data points as well as the 2D sparse instance segmentation masks for training the instance segmentation model obviates the need to generate and use actual instance segmentation data for training, thereby providing an improved technique for training an instance segmentation model.

20 Claims, 10 Drawing Sheets

INSTANCE SEGMENTATION USING SENSOR DATA HAVING DIFFERENT DIMENSIONALITIES

The present invention relates generally to instance segmentation, and more particularly, in some embodiments, to instance segmentation using sensor data having different dimensionalities.

BACKGROUND

On-board sensors in a vehicle, such as an autonomous vehicle, supplement and bolster a vehicle's (field-of-view) FOV by providing continuous streams of sensor data captured from the vehicle's surrounding environment. Sensor data is used in connection with a diverse range of vehicle-based applications including, for example, blind spot detection, lane change assisting, rear-end radar for collision warning or collision avoidance, park assisting, cross-traffic monitoring, brake assisting, emergency braking, and automated distance control.

On-board vehicle sensors may include, for example, cameras, light detection and ranging (LiDAR)-based systems, radar-based systems, Global Positioning System (GPS) systems, sonar-based sensors, ultrasonic sensors, inertial measurement units (IMUs), accelerometers, gyroscopes, magnetometers, and far infrared (FIR) sensors. Sensor data may include image data, reflected laser data, or the like. Often, images captured by on-board sensors utilize a three-dimensional coordinate system to determine the distance and angle of objects in the image with respect to each other and with respect to the vehicle. In particular, such real-time spatial information may be acquired near a vehicle using various on-board sensors located throughout the vehicle, which may then be processed to calculate various vehicle parameters and determine safe driving operations of the vehicle.

In order for autonomous vehicles to operate successfully, they must understand the environment around them. In order to do so, autonomous vehicles may utilize deep learning techniques to train neural networks or other machine learning models to perform various tasks such as object detection, semantic segmentation, instance segmentation, and the like. Training a machine learning model to perform a machine learning task requires providing training data to the model as input. The training data is often data collected from various sensors that has been annotated in various ways through a laborious manual process. Discussed herein are technical solutions that solve a technical problem associated with conventional machine learning model training by providing a more efficient technique for generating input data for training a machine learning model to perform a machine learning task.

SUMMARY

In an example embodiment, a computer-implemented method for training an instance segmentation model using sensor data having different dimensionalities is disclosed. The method includes capturing first sensor data having a first dimensionality using a first sensor and second sensor data having a second dimensionality using a second sensor and assigning a first set of labels to the first sensor data to obtain labeled first sensor data and a second set of labels to the second sensor data to obtain labeled second sensor data. The method further includes projecting the first sensor data onto the second sensor data to obtain training data and providing the training data as input to the instance segmentation model. The method additionally includes generating, based at least in part on the training data and the first set of labels, a set of sparse instance segmentation masks having the second dimensionality and utilizing the set of sparse instance segmentation masks to perform loss propagation during training of the instance segmentation model.

In an example embodiment, the first sensor data is three-dimensional (3D) point cloud data and the second sensor data is two-dimensional (2D) image data.

In an example embodiment, assigning the first set of labels to the first sensor data includes applying 3D bounding boxes to the 3D point cloud data, and assigning the second set of labels to the second sensor data includes applying 2D bounding boxes to the 2D image data.

In an example embodiment, the first sensor is a LiDAR sensor and the second sensor is a camera, and projecting the first sensor data onto the second sensor data to obtain the training data includes determining a set of 3D point cloud data points captured by the LiDAR during a same frame as a 2D image of the 2D image data is captured by the camera, determining at least a subset of the 3D point cloud data points within a FOV of the camera, and projecting the at least a subset of the 3D point cloud data points onto the 2D image to obtain at least a portion of the training data.

In an example embodiment, the method for training the instance segmentation model additionally includes determining a set of extrinsics between the LiDAR and the camera, the set of extrinsics including rotational and translational information between a location of the LiDAR and a location of the camera.

In an example embodiment, determining the at least a subset of the 3D point cloud data points within the FOV of the camera includes determining the at least a subset of the 3D point cloud data points based at least in part on the set of extrinsics.

In an example embodiment, the method for training the instance segmentation model additionally includes identifying LiDAR-specific metadata associated with the projected 3D point cloud data points and associating the LiDAR-specific metadata with the training data.

In an example embodiment, providing the training data as input to the instance segmentation model includes providing the training data having the LiDAR-specific metadata associated therewith as input to the instance segmentation model.

In an example embodiment, the LiDAR-specific metadata includes a respective at least one of a depth value, intensity value, or height value associated with each of one or more of the projected 3D point cloud data points.

In an example embodiment, the set of sparse instance segmentation masks is a set of 2D sparse instance segmentation masks, and determining the set of 2D sparse instance segmentation masks includes selecting a first projected 3D point cloud data point; determining that the first projected 3D point cloud data point is associated with a first 3D label of the first set of labels; determining a first object corresponding to the first 3D label; determining that a particular 2D sparse instance segmentation mask being generated corresponds to the first object; and associating a respective positive value with each of one or more pixels in the 2D image that contain the first projected 3D point cloud data point.

In an example embodiment, the method for training the instance segmentation model additionally includes selecting a second projected 3D point cloud data point; determining that the second projected 3D point cloud data point is not associated with a 3D label in the first set of labels or determining that the second projected 3D point cloud data point is associated with a second 3D label in the first set of labels that corresponds to a second object that does not correspond to the particular 2D sparse instance segmentation mask being generated; and associating a respective negative value with each of one or more pixels in the 2D image that contain the second projected 3D point cloud data point.

In an example embodiment, the 3D point cloud data is first 3D point cloud data and the 2D image data is first 2D image data, and the method for training the instance segmentation model additionally includes applying the trained 2D instance segmentation model to second 2D image data to obtain a set of one or more proposed 2D instance segmentation masks; projecting second 3D point cloud data associated with a same frame as the second 2D image data onto the second 2D image data; utilizing the set of one or more proposed 2D instance segmentation masks to determine a respective 3D object corresponding to each projected 3D data point of the second 3D point cloud data; and assigning a respective 3D segmentation label to each projected 3D data point based on the respective corresponding 3D object.

In an example embodiment, a system for training an instance segmentation model using sensor data having different dimensionalities is disclosed. The system includes at least one processor and at least one memory storing computer-executable instructions. The at least one processor is configured to access the at least one memory and execute the computer-executable instructions to perform a set of operations including capturing first sensor data having a first dimensionality using a first sensor and second sensor data having a second dimensionality using a second sensor and assigning a first set of labels to the first sensor data to obtain labeled first sensor data and a second set of labels to the second sensor data to obtain labeled second sensor data. The set of operations further includes projecting the first sensor data onto the second sensor data to obtain training data and providing the training data as input to the instance segmentation model. The set of operations additionally includes generating, based at least in part on the training data and the first set of labels, a set of sparse instance segmentation masks having the second dimensionality and utilizing the set of sparse instance segmentation masks to perform loss propagation during training of the instance segmentation model.

The above-described system is further configured to perform any of the operations/functions and may include any of the additional features/aspects of example embodiments of the invention described above in relation to example computer-implemented methods of the invention.

In an example embodiment, a computer program product for training an instance segmentation model using sensor data having different dimensionalities is disclosed. The computer program product includes a non-transitory computer readable medium storing computer-executable program instructions that, when executed by a processing circuit, cause a method to be performed. In an example embodiment, the method includes capturing first sensor data having a first dimensionality using a first sensor and second sensor data having a second dimensionality using a second sensor and assigning a first set of labels to the first sensor data to obtain labeled first sensor data and a second set of labels to the second sensor data to obtain labeled second sensor data. The method further includes projecting the first sensor data onto the second sensor data to obtain training data and providing the training data as input to the instance segmentation model. The method additionally includes generating, based at least in part on the training data and the first set of labels, a set of sparse instance segmentation masks having the second dimensionality and utilizing the set of sparse instance segmentation masks to perform loss propagation during training of the instance segmentation model.

The above-described computer program product is further configured to perform any of the operations/functions and may include any of the additional features/aspects of example embodiments of the invention described above in relation to example computer-implemented methods of the invention.

These and other features of the systems, methods, and non-transitory computer readable media disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for purposes of illustration and description only and are not intended as a definition of the limits of the invention.

BRIEF DESCRIPTION OF THE DRAWINGS

Certain features of various embodiments of the present technology are set forth with particularity in the appended claims. A better understanding of the features and advantages of the technology will be obtained by reference to the following detailed description that sets forth illustrative embodiments, in which the principles of the invention are utilized, and the accompanying drawings of which:

DETAILED DESCRIPTION

Figure 1:
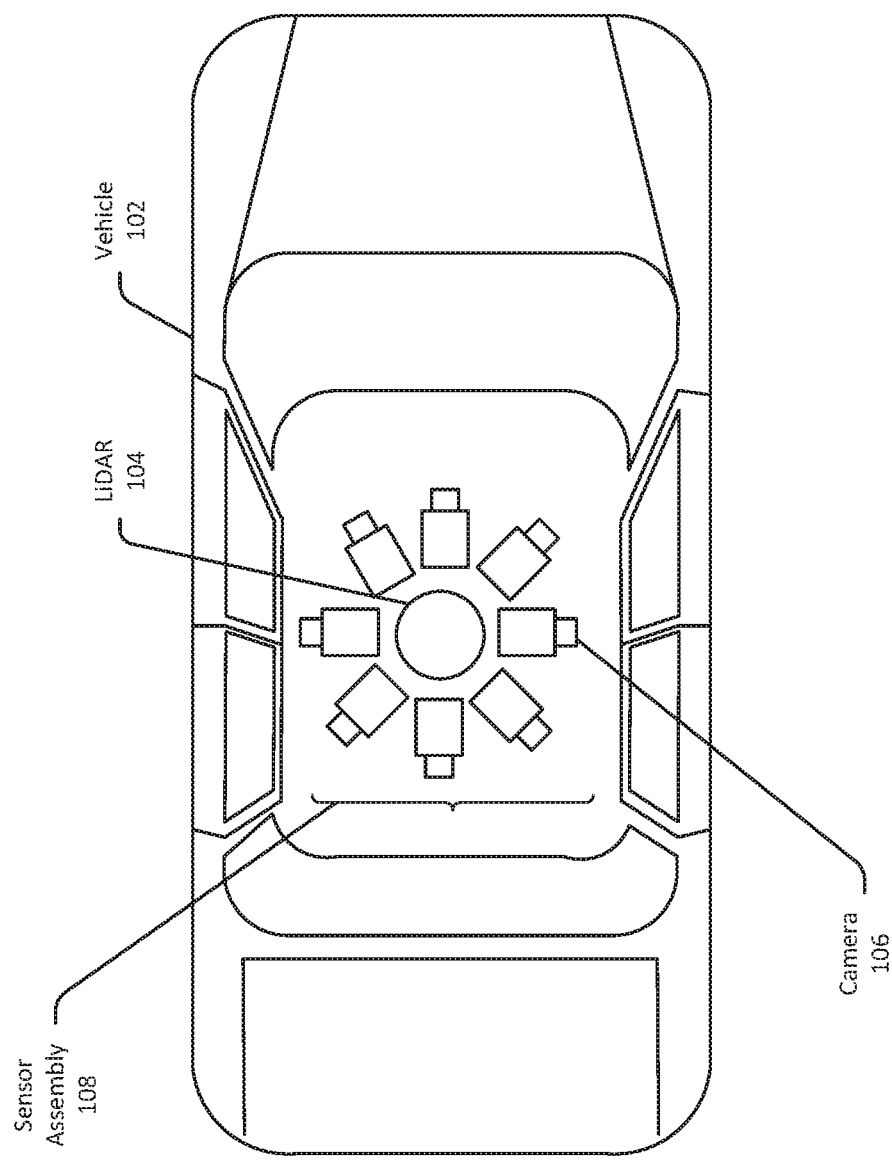
FIG. 1 is an aerial view of a sensor assembly that includes a LiDAR sensor and a plurality of cameras in accordance with an example embodiment of the invention.

In the following description, certain specific details are set forth in order to provide a thorough understanding of various embodiments of the invention. However, one skilled in the art will understand that the invention may be practiced without these details. Moreover, while various embodiments of the invention are disclosed herein, many adaptations and modifications may be made within the scope of the invention in accordance with the common general knowledge of those skilled in this art. Such modifications include the substitution of known equivalents for any aspect of the invention in order to achieve the same result in substantially the same way.

Unless the context requires otherwise, throughout the present specification and claims, the word "comprise" and variations thereof, such as, "comprises" and "comprising" are to be construed in an open, inclusive sense, that is as "including, but not limited to." Recitation of numeric ranges of values throughout the specification is intended to serve as a shorthand notation of referring individually to each separate value falling within the range inclusive of the values defining the range, and each separate value is incorporated in the specification as it were individually recited herein. Additionally, the singular forms "a," "an" and "the" include plural referents unless the context clearly dictates otherwise. The phrases "at least one of," "at least one selected from the group of," or "at least one selected from the group consisting of," and the like are to be interpreted in the disjunctive (e.g., not to be interpreted as at least one of A and at least one of B).

Reference throughout this specification to "one embodiment" or "an embodiment" means that a particular feature, structure or characteristic described in connection with the embodiment is included in at least one embodiment of the present invention. Thus, the appearances of the phrases "in one embodiment" or "in an embodiment" in various places throughout this specification are not necessarily all referring to the same embodiment, but may be in some instances. Furthermore, the particular features, structures, or characteristics may be combined in any suitable manner in one or more embodiments.

In general, a vehicle (e.g., an autonomous vehicle) can have a myriad of sensors onboard the vehicle. Such sensors can be disposed on an exterior or in an interior of a vehicle and can include, without limitation, LiDAR sensors, radars, cameras, GPS receivers, sonar-based sensors, ultrasonic sensors, IMUs, accelerometers, gyroscopes, magnetometers, FIR sensors, and so forth. Such sensors play a central role in the functioning and operation of an autonomous vehicle. For example, LiDARs can be utilized to detect objects (e.g., other vehicles, road signs, pedestrians, buildings, etc.) in an environment around a vehicle. LiDARs can also be utilized to determine relative distances between objects in the environment and between objects and the vehicle. As another non-limiting example, radars can be utilized in connection with collision avoidance, adaptive cruise control, blind spot detection, assisted parking, and other vehicle applications. As yet another non-limiting example, cameras can be utilized to capture images of an environment and object detection, instance segmentation, or other deep learning tasks can be executed on the captured images to recognize, interpret, and delineate objects captured in the images and/or visual cues of the objects. Cameras and other optical sensors can capture image data using charge coupled devices (CCDs), complementary metal oxide semiconductors (CMOS), or similar elements. Data collected from these various aforementioned sensors can be processed and used, as inputs, to algorithms configured to make various autonomous driving decisions including decisions relating to when and how much to accelerate, decelerate, change direction, or the like.

Various pre-processing may be performed on sensor data captured by different types of sensors before the sensor data is provided as input to algorithms, calculations, or the like that are executed/performed in connection with operations relating to autonomous vehicle operation, for example. For instance, sensor data captured by various sensors may be used as a training dataset to train one or more machine learning models/classifiers that may be used in connection with a range of tasks such as object detection, semantic segmentation, instance segmentation, 3D regression, or the like.

Instance segmentation is a machine learning task that involves identifying and delineating each instance of each type of object present in an image. Instance segmentation can thus be thought of as a combination of object detection (which involves detecting the presence of each object in an image) and semantic segmentation (classifying each pixel of an image as being part of a particular object). Instance segmentation is useful across a wide range of applications such as object counting, emphasizing the outline/border of an object for a visually-impaired individual, and so forth.

In order to train a deep learning model to perform instance segmentation, instance segmentation data needs to be generated and provided to the model as input. Conventional techniques for generating instance segmentation training data typically involve generating full pixel-level segmentation masks that segment each object instance in an image. Generating such full pixel-level segmentation masks for the training data can involve the laborious manual process of delineating the boundary of each object instance in the image data used for the training. This process can be particularly time-intensive for object instances with irregular boundaries. Thus, generating instance segmentation data, and in particular, the full pixel-level segmentation masks that are conventionally required for training instance segmentation models is a time-intensive and laborious process that constitutes a technical problem associated with conventional instance segmentation training.

Various embodiments of the invention overcome technical problems specifically arising in the realm of computer-based technology, and more specifically, in the realm of machine learning technology, particularly as it relates to autonomous vehicle technology. Example embodiments of the invention provide technical solutions to the above-described technical problem associated with conventional techniques for generating instance segmentation data to train an instance segmentation model. Example embodiments provide such technical solutions in the form of systems, methods, non-transitory computer-readable media, techniques, and methodologies for training a deep learning model capable of performing both 2D and 3D instance segmentation without requiring any actual instance segmented data as training data.

In example embodiments, 3D point cloud data such as that captured by a LiDAR sensor can be used as ground truth training data for training an instance segmentation deep learning model. In particular, in example embodiments, 3D point cloud data captured by a LiDAR is projected on a 2D image captured by a camera. LiDAR-camera extrinsics such as translational and/or rotational information for converting between a coordinate system of the LiDAR and a coordinate system of the camera can be used to determine which 3D LiDAR data points are within the camera FOV, and thus, which 3D data points to project onto the 2D camera image plane.

The 2D image data having the 3D LiDAR point cloud data points projected thereon may be provided as input training data to an instance segmentation model. In some example embodiments, the 2D image data with projected 3D LiDAR data points may be labeled data, where the 2D image data is labeled with 2D bounding boxes (e.g., rectangles) and the 3D point cloud data is labeled with 3D bounding boxes (e.g., rectangular prisms). In addition, in example embodiments, the 2D image data may be frame synchronized with the 3D LiDAR point cloud data to associate 2D labels (e.g., 2D bounding boxes) with corresponding 3D labels (e.g., 3D bounding boxes). Further, in some example embodiments, LiDAR-specific metadata such as depth values, intensity values, height values, or the like associated with the projected 3D point cloud data may be appended or otherwise associated with the 2D image data and used as input features for training the instance segmentation model.

In example embodiments, the projected 3D LiDAR point cloud data points and the 3D labels applied to the 3D LiDAR point cloud data (e.g., the rectangular prism bounding boxes) may be used to create 2D sparse instance segmentation masks. The 2D sparse instance segmentation masks may be used when propagating loss during training of the 2D instance segmentation model. In example embodiments, a respective 2D sparse instance segmentation mask may be generated for each object instance in a 2D camera image. After projecting the 3D LiDAR point cloud data into 2D camera space, each projected LiDAR data point may be associated with a corresponding object instance. More specifically, for each projected LiDAR data point, the labeled 3D point cloud data may be used to determine which 3D label (e.g., which 3D bounding box) contains the projected LiDAR data point. The projected LiDAR data point may then be associated with the object instance corresponding to the bounding box that contains the LiDAR data point. One or more pixels in the 2D image that contain the projected LiDAR data point may then be assigned a positive value (e.g., a binary ON value) in the 2D sparse segmentation mask corresponding to the object instance or a negative value (e.g., a binary OFF value) in each other 2D sparse segmentation mask corresponding to a different object instance.

Use of 2D sparse segmentation masks (generated as described above using 3D LiDAR data points) to train a 2D instance segmentation model (e.g., to perform loss propagation during a training phase for the model) yields a trained model that provides at least as good performance and often better performance than conventional instance segmentation models trained using actual instance segmentation data. This equal if not better performance for the trained 2D instance segmentation model is achieved without having to generate instance segmentation data including full pixel-level segmentation masks that are required for conventional 2D instance segmentation training. Thus, in response to the technical problem associated with the conventional time-intensive and laborious process for generating actual instance segmentation data (e.g., full pixel-level segmentation masks), example embodiments of the invention provide a technical solution in the form of training data that includes 2D image data with 3D LiDAR data points projected thereon and 2D sparse segmentation masks formed from the projected 3D LiDAR data points that can be used in lieu of actual instance segmentation data to train an instance segmentation model. This technical solution represents an improvement to computer technology, in particular, machine learning technology.

In addition, in example embodiments of the invention, the trained 2D instance segmentation model can be used to perform 3D instance segmentation. For example, during an inference phase, test 2D image data may be provided to the trained 2D instance segmentation model, which may output a set of proposed 2D instance segmentation masks. Metadata associated with the 3D LiDAR data (e.g., depth values, intensity values, height values, etc.) may also be provided as input to the trained 2D instance segmentation model. 3D LiDAR point cloud data points corresponding to the same frame as the test 2D image and within the FOV of the camera that captured the image may then be projected onto the 2D image. The proposed 2D instance segmentation masks may then be used to determine which 3D data points correspond to which 3D object instances, thereby obtaining 3D segmentation labels on a per LiDAR data point basis. Thus, example embodiments of the invention provide the additional technical solution and improvement to machine learning technology of utilizing a trained 2D instance segmentation model to obtain 3D segmentation labels without having to explicitly train the model to perform 3D instance segmentation.

FIG. 1 is an aerial view of a sensor assembly 108 in accordance with an example embodiment of the invention. The sensor assembly 108 may include a variety of different types of sensors including, for example, one or more LiDAR sensors 104 and one or more cameras 106. Although not depicted in FIG. 1, the sensor assembly 108 may further include other types of sensors such as, for example, one or more IMUs, one or more GPS receivers, and so forth. In the example configuration depicted in FIG. 1, the LiDAR sensor 104 is centrally located on a roof of a vehicle 102 (which may be an autonomous vehicle) and is surrounded by multiple cameras that are positioned circumferentially around the LiDAR sensor 104. In example embodiments, the LiDAR sensor 104 may periodically rotate through a scan path during which the LiDAR 104 may illuminate objects in the scanned environment with periodic pulses of light and measure the differences in flight times and wavelengths for light that is reflected back to detect the presence of target objects, determine distances between the vehicle 102 and the target objects, determine distances between various target objects in the sensed environment, and the like. More specifically, the LiDAR 104 may be configured to generate digital 3D representations of targets that were illuminated by the light pulses based on the measured differences in flight times and wavelengths for light that is reflected back to the LiDAR 104. In particular, the LiDAR sensor 104 may generate a 3D point cloud (a set of data points in 3D space) representative of one or more target objects that were illuminated with light during the LiDAR's 104 scan path. The LiDAR 104 may exhibit a horizontal scan path and/or a vertical scan path.

In example embodiments, as the LiDAR 104 travels through its scan path, it may become aligned with each camera 106 of the sensor assembly at a respective particular point in time. As used herein, the term "frame," "data frame," "image frame," or the like may be used to connote a time splice (e.g., a period of time) during which the LiDAR 104 captures a collection of 3D point cloud data points as part of its scan path and each of the cameras 106 capture respective image data. A set of extrinsics including, for example, various rotational and translational information indicative of a relative location of the LiDAR 104 in relation to a camera 106 can be determined and used to determine which 3D LiDAR data points are within a particular camera's 106 FOV for a given frame. As will be described in more detail later in this disclosure, the set of extrinsics can be used to determine which 3D LiDAR data points to project onto a 2D image from a particular camera 106 for a given frame. While a single sensor assembly 108 is depicted in FIG. 1, it should be appreciated that multiple such sensor assemblies 108 may be provided and may located in any suitable portion of the exterior and/or interior of the vehicle 102. Further, each sensor assembly 108 may include any number of LiDAR(s) 104 and any number cameras 106 provided in any suitable arrangement.

Figure 2A:
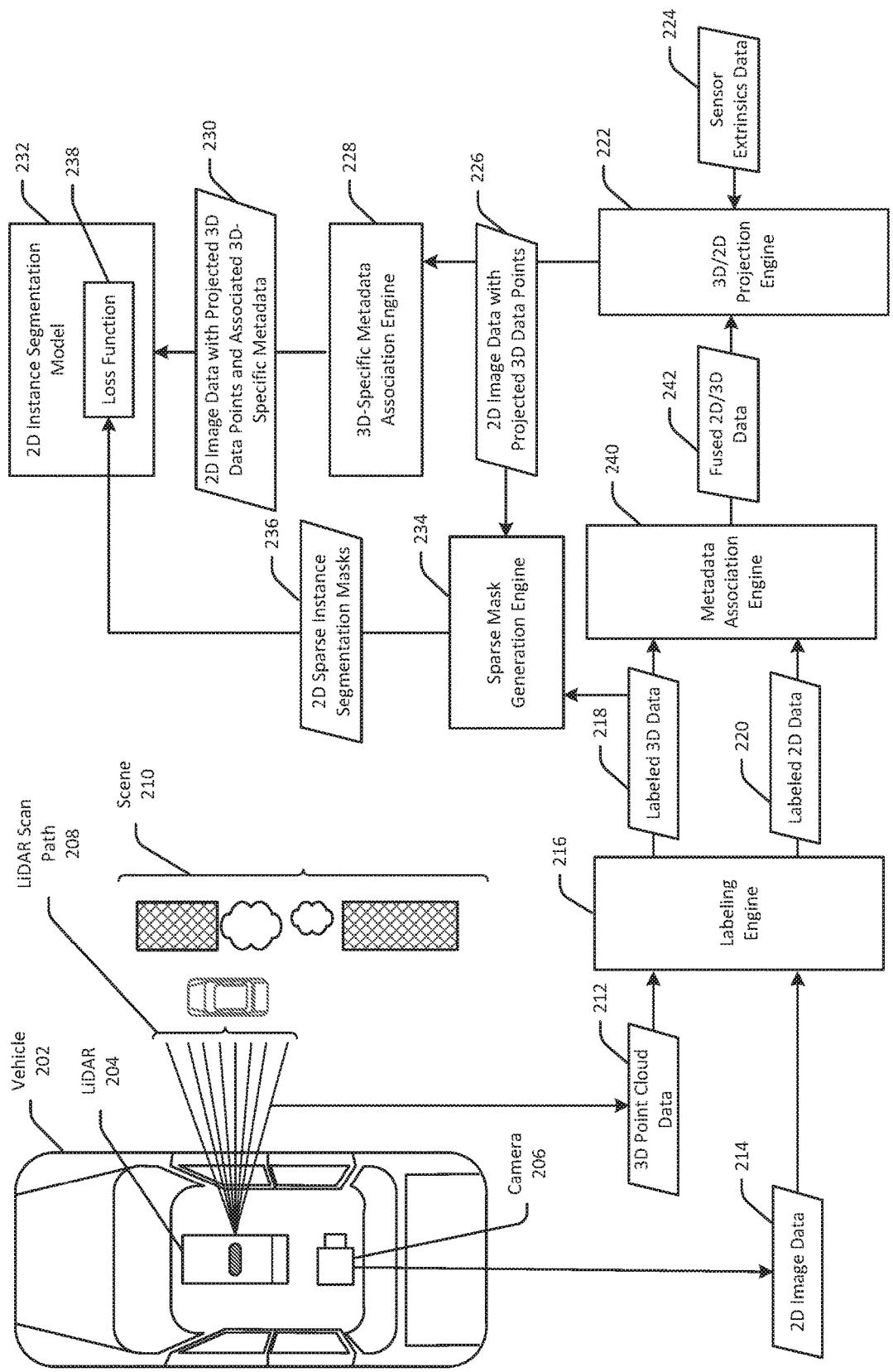
FIG. 2A is a hybrid data flow and block diagram illustrating training of a two-dimensional (2D) instance segmentation model using labeled sensor data having different dimensionalities in accordance with an example embodiment of the invention.
Figure 4A:
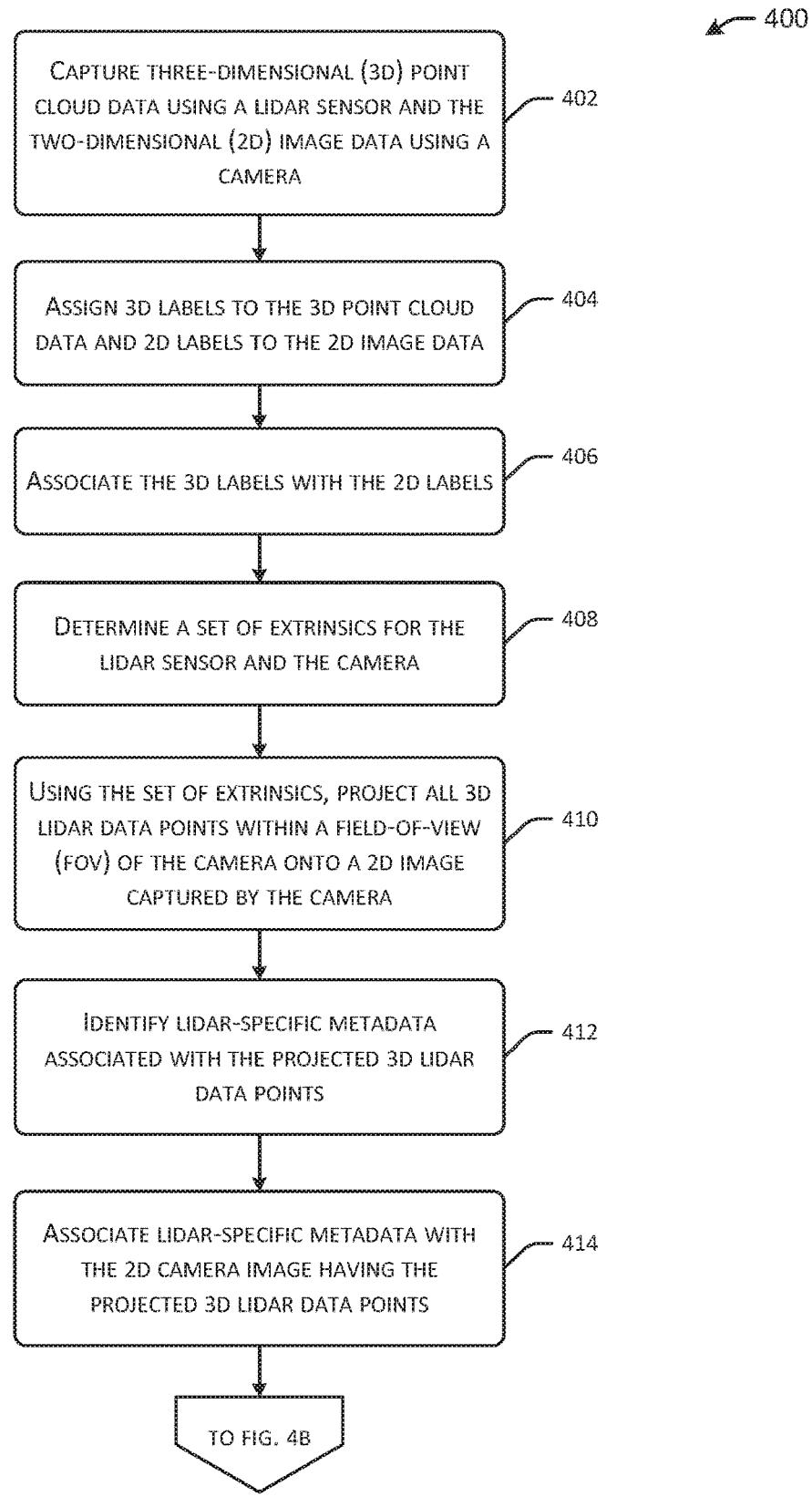
FIGS. 4A-4B is a process flow diagram of an illustrative method for training a 2D instance segmentation model using labeled sensor data having different dimensionalities and propagating loss of the model during training using 2D sparse instance segmentation masks generated from 2D image data having 3D point cloud data projected thereon in accordance with an example embodiment of the invention.
Figure 4B:
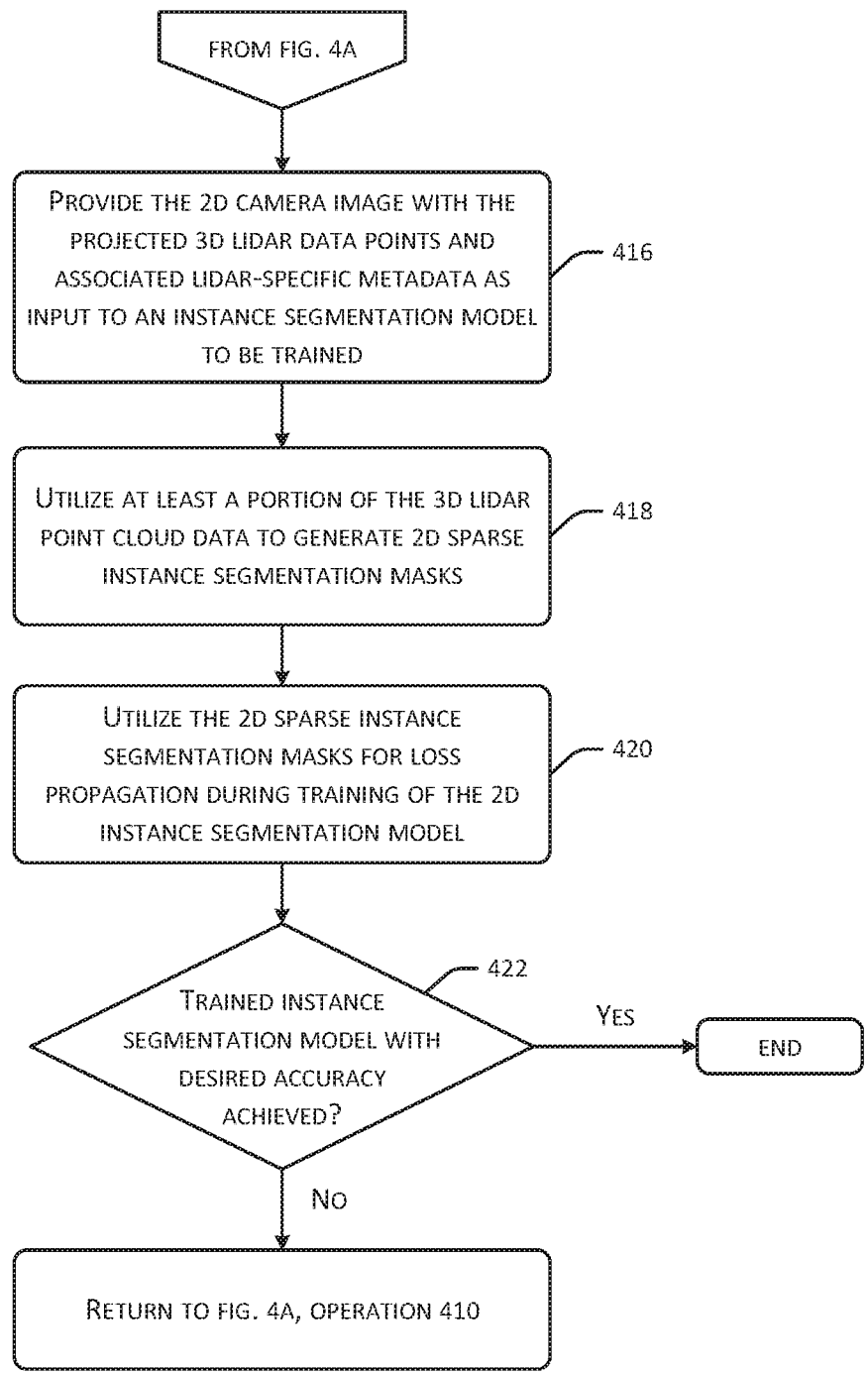
Figure 5:
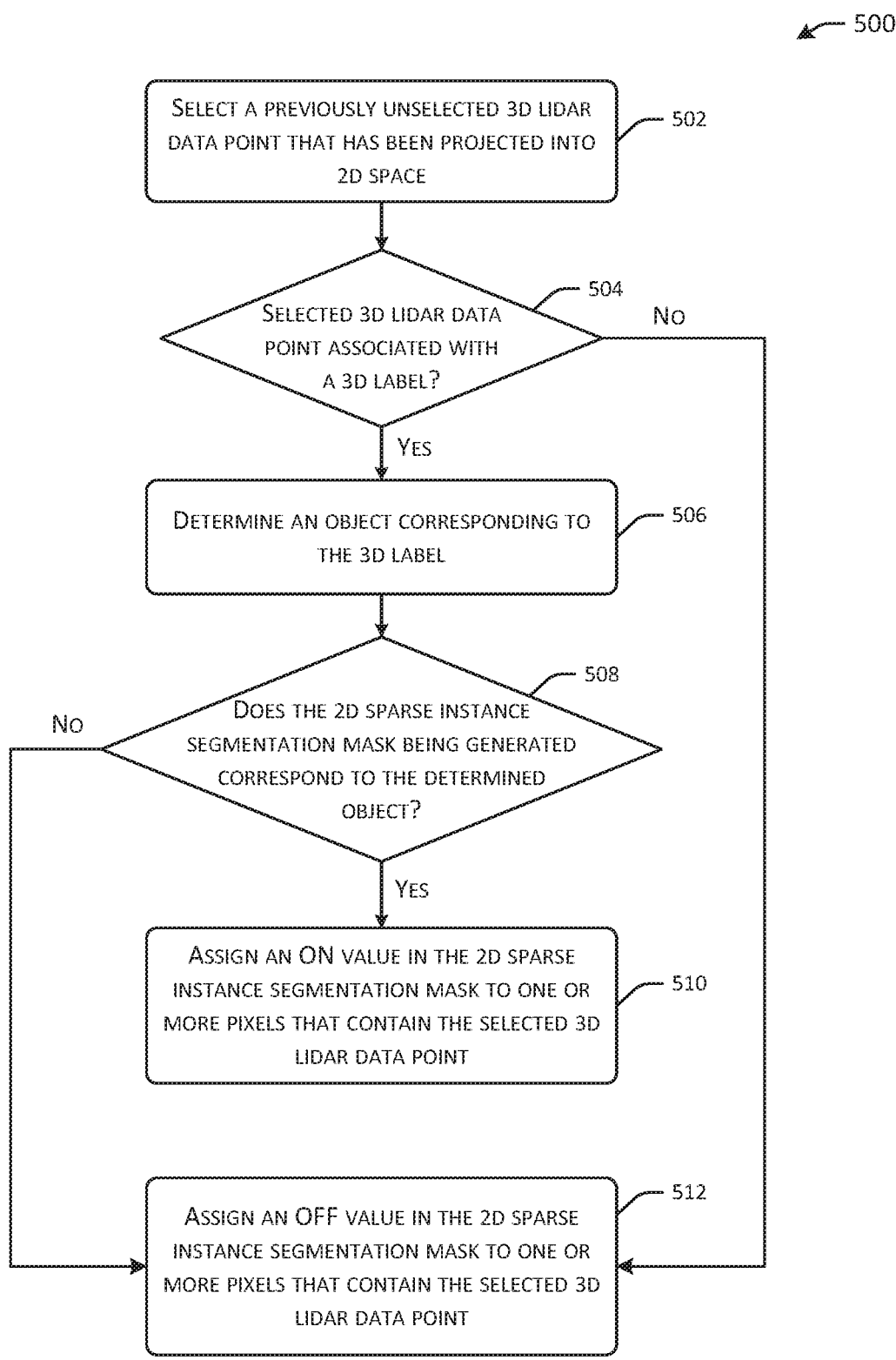
FIG. 5 is a process flow diagram of an illustrative method for generating the 2D sparse instance segmentation masks in accordance with an example embodiment of the invention.

FIG. 2A is a hybrid data flow and block diagram illustrating training of a 2D instance segmentation model using labeled sensor data having different dimensionalities in accordance with an example embodiment of the invention. FIGS. 4A-4B are process flow diagrams of an illustrative method 400 for training a 2D instance segmentation model using labeled sensor data having different dimensionalities and propagating loss of the model during training using 2D sparse instance segmentation masks generated from 2D image data having 3D point cloud data projected thereon in accordance with an example embodiment of the invention. FIG. 5 is a process flow diagram of an illustrative method 500 for generating the 2D sparse instance segmentation masks in accordance with an example embodiment of the invention. The example methods 400 and 500 of FIGS. 4A-4B and FIG. 5, respectively, will be described hereinafter in conjunction with FIG. 2A.

Any operation of any of the methods 400-600 disclosed herein can be performed by one or more of the engines/program modules depicted in FIG. 2A, FIG. 2B, and/or FIG. 7, whose operation will be described in more detail hereinafter. These engines/program modules can be implemented in any combination of hardware, software, and/or firmware. In certain example embodiments, one or more of these engines/program modules can be implemented, at least in part, as software and/or firmware modules that include computer-executable instructions that when executed by a processing circuit cause one or more operations to be performed. In example embodiments, these engines/program modules may be customized computer-executable logic implemented within a customized computing machine such as a customized FPGA or ASIC. A system or device described herein as being configured to implement example embodiments of the invention can include one or more processing circuits, each of which can include one or more processing units or cores. Computer-executable instructions can include computer-executable program code that when executed by a processing core can cause input data contained in or referenced by the computer-executable program code to be accessed and processed by the processing core to yield output data.

Referring first to FIG. 2A, a vehicle 202 is depicted. The vehicle 202 may be any suitable type of vehicle including, without limitation, a car; a truck; a two-wheeled vehicle such as a motorcycle, moped, scooter, or the like; a vehicle with more than two axles (e.g., a tractor trailer); and so forth. The vehicle 202 include various on-board vehicle sensors such as a LiDAR 204 and one or more cameras 206. In example embodiments, the vehicle 202 may be the vehicle 102 and the LiDAR 204 and camera 206 may form part of the sensor assembly 108 depicted in FIG. 1. It should be appreciated that a single LiDAR 204 and a single camera 206 are depicted in FIG. 2A for ease of explanation, and that any number of LiDAR(s) 204 and any number of camera(s) 206 may be provided with the vehicle 202 and data from any such number of LiDAR(s) 204 and/or camera(s) 206 may be used in example embodiments of the invention.

Referring now to FIG. 4A in conjunction with FIG. 2A, at block 402 of the method 400, the LiDAR 204 may capture 3D point cloud data 212 and the camera 206 may capture 2D image data 214. As previously noted, it should be appreciated that the 3D point cloud data 212 may include LiDAR data points captured by multiple LiDARs 204 over multiple frames, each frame corresponding to a period of time. Similarly, the 2D image data 214 may include 2D images captured by multiple cameras 206 over multiple frames. The 3D point cloud data 212 may include 3D data points corresponding to targets in a scene 210 that are illuminated by the LiDAR 204 as it traverses a scan path 208. The 3D LiDAR data points may correspond to multiple instances of objects in the scene 210. The objects may correspond to one or more object types including dynamic objects such as other vehicles, pedestrians, animals, etc. and/or static objects such as vegetation, physical structures, signage, etc.

Still referring to FIG. 4A in conjunction with FIG. 2A, at block 404 of the method 400, a labeling engine 216 may be executed to assign a set of 3D labels to the 3D point cloud data 212 to obtain labeled 3D LiDAR point cloud data 218 and to assign a set of 2D labels to the 2D image data 214 to obtain labeled 2D image data 220. In example embodiments, the 3D labels may include a 3D bounding box (e.g., a rectangular prism) formed around each instance of a 3D object in the data 212 and the 2D labels may include a 2D bounding box (e.g., a rectangle) formed around each instance of a 2D object in the data 214. In some example embodiments, the labeling engine 216 may facilitate manual labeling of the data 212, 214 with the 3D and 2D bounding boxes, respectively.

At block 406 of the method 400, a metadata association engine 240 may be executed to associate the 3D labels of the labeled 3D data 218 with the 2D labels of the labeled 2D data 220. More specifically, in example embodiments, the metadata association engine 240 may associate each 2D label with each corresponding 3D label that is representative of the same object in each frame. In this manner, the metadata association engine 240 may generate fused 2D/3D data 242 in which 2D and 3D labels that correspond to the same object are associated/linked together on a per-frame basis. In example embodiments, a frame synchronization may be performed prior to, after, and/or at least partially concurrently with the metadata (e.g., label) association performed by the metadata association engine 240. The metadata association engine 240 may perform the frame synchronization and/or another engine may be customized to perform the frame synchronization. Frame synchronization between 2D image frames captured by the camera 206 and 3D point cloud data captured during vertical and/or horizontal scans of the LiDAR 204 may be performed to ensure that each 2D camera image capture and each LiDAR scan within a FOV of the camera image capture are synchronized. In example embodiments, sensor extrinsics data 224 indicative of calibration extrinsics associated with the LiDAR 204 and the camera 206 as well as timing data received from the LiDAR 204 and the camera 206 may be used to perform the frame synchronization. The timing data may include, for example, shutter times for the camera 206 (e.g., number of milliseconds required for the camera 206 to capture an image) as well as timestamps associated with each scan of the LiDAR 204.

At block 408 of the method 400, a set of extrinsics (e.g., the sensor extrinsics data 224) may be determined. The sensor extrinsics data 224 may include translational and rotational information (e.g., a translational matrix, a rotational matrix, etc.) that defines a location of the LiDAR 204 relative to a location of the camera 206. The sensor extrinsics data 224 may enable converting 3D data in a coordinate system of the LiDAR 204 to a 2D coordinate system associated with the camera 206, and vice versa.

At block 410 of the method 400, a 3D/2D projection engine 222 may be executed to project, using the sensor extrinsics data 224, 3D LiDAR data points that are within a FOV of the camera 206 onto a 2D image captured by the camera 206. More specifically, a set of 3D LiDAR data points in the 3D data 212 (or the labeled 3D data 218) that corresponds to a same frame as a 2D image of the 2D image data 214 (or the labeled 2D data 220) may be identified. Then, at least a subset of the set of 3D LiDAR data points that is within a FOV of the camera 206 may be determined based on the sensor extrinsics data 224 and projected onto the 2D image to obtain 2D image data with projected 3D LiDAR data points 226.

Figure 3A:
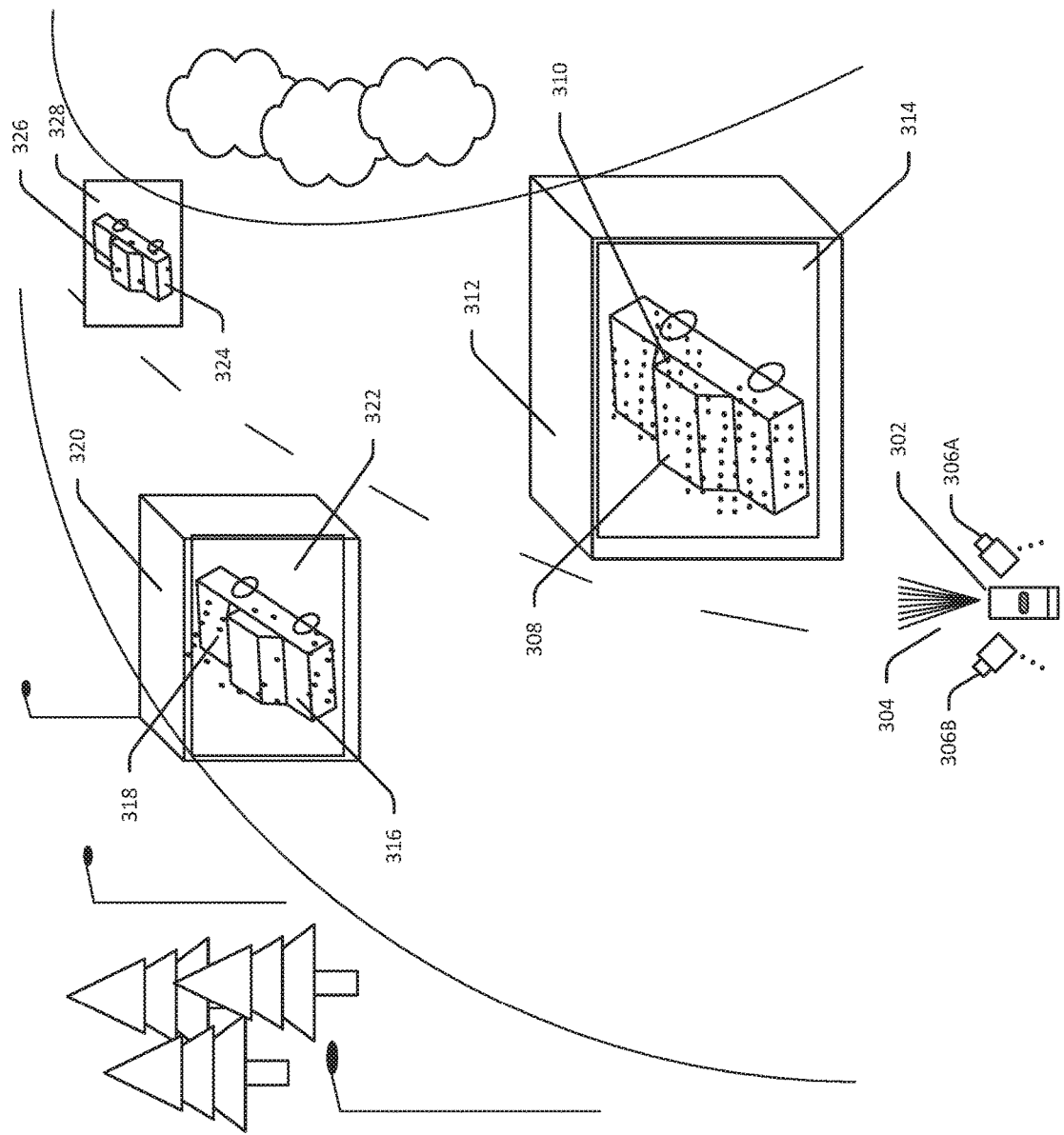
FIG. 3A illustrates 3D point cloud data projected onto a 2D image in accordance with an example embodiment of the invention.

FIG. 3A illustrates an example of 3D point cloud data points that are projected onto a 2D image in accordance with an example embodiment of the invention. A LiDAR 302 is illustratively shown in FIG. 3A. The LiDAR 302 may be a particular implementation of the LiDAR 204. Also depicted are multiple cameras 306A, 306B, which may represent particular implementations of the camera 206. While two cameras are illustratively depicted, any number of cameras may be provided. The 3D LiDAR data points depicted in FIG. 3A as being projected onto the 2D image may be those data points captured during a portion of a scan path 304 of the LiDAR 302 (a particular frame) that are within a FOV of a camera (e.g., one of cameras 306A, 306B) that captured the 2D image during the same frame.

In some example embodiments, the 2D image may be a labeled 2D image in which 2D bounding boxes (e.g., rectangles) have been assigned to various object instances in the 2D image. Similarly, the 3D LiDAR points projected onto the 2D image may be taken from the labeled 3D data 218. In other example embodiments, the 2D image may be part of the unlabeled 2D image data 214 and/or the 3D LiDAR points projected onto the 2D image may be part of the unlabeled 3D data 212.

As shown in FIG. 3A, various objects may be captured in the 2D image. For instance, a first object 308 may be associated with a 2D bounding box 314. A set of 3D LiDAR data points 310 projected onto the 2D image may be contained within a 3D bounding box 312 corresponding to the same first object 308. As previously noted, the sensor extrinsics data 224 may be used to determine which 3D LiDAR data points are within the FOV of the camera that captured the 2D image depicted in FIG. 3A.

In addition, the 2D camera image may include a second object 316 associated with a 2D bounding box 322. A set of 3D LiDAR data points 318 projected onto the 2D image may be contained within a 3D bounding box 320 corresponding to the same second object 316. Still further, the 2D image may include a third object 324 associated with a 2D bounding box 328. A set of 3D LiDAR data points 326 projected on the 2D image may correspond to the same third object 324. While each of the first object 308, the second object 316, and the third object 324 are illustratively shown as being a vehicle, it should be appreciated that any of a variety of different types of objects may be present in the 2D image and may have corresponding 3D LiDAR data points projected thereon. For instance, any of the other object types depicted in FIG. 3A may have 3D LiDAR data points projected thereon (potentially contained within 3D bounding boxes) and such objects may be contained within corresponding 2D bounding boxes.

As depicted in FIG. 3A, the density of the 3D LiDAR data points projected onto the 2D image may vary based on the proximity of the corresponding object to the LiDAR 302. For instance, the density of the set of projected 3D LiDAR data points 310 is greater than a density of the set of projected 3D LiDAR data points 318, which in turn, is greater than a density of the set of projected 3D LiDAR data points 326. In some example embodiments, a collection of projected 3D LiDAR data points may be so sparse that no corresponding 3D bounding box is formed around the collection of 3D data points, as shown in connection with the set of 3D LiDAR data points 326.

Referring again to FIG. 4A in conjunction with FIG. 2A, at block 412 of the method 400, a 3D-specific metadata association engine 228 may be executed to determine LiDAR-specific metadata associated with the projected 3D LiDAR data points. In example embodiments, the LiDAR-specific metadata may include, for example, a respective depth value for each projected LiDAR data point that indicates a physical distance between a portion of an object represented by the LiDAR data point and the LiDAR 204; a respective intensity value for each projected LiDAR data point; and a respective height value for each projected LiDAR data point that indicates a height of a portion of an object represented by the LiDAR data point in relation to a height of the LiDAR 204 or a reference height such as a road surface. It should be appreciated that the LiDAR-specific metadata may include other 3D metadata associated with the projected LiDAR data points.

At block 414 of the method 400, the 3D-specific metadata association engine 228 may be executed to associate the LiDAR-specific metadata with the 2D image data having the 3D LiDAR data points projected thereon 226 to obtain data 230. In some example embodiments, the 3D-specific metadata association engine 228 may append the 3D-specific metadata to the 2D camera image with the projected LiDAR data points as additional input channel features for training a 2D instance segmentation model 232.

Referring now to FIG. 4B in conjunction with FIG. 2A, at block 416 of the method 400, the 2D camera image with the projected 3D LiDAR data points and associated LiDAR-specific metadata (collectively data 230) may be provided as input training data to the 2D instance segmentation model 232. Then, at block 418 of the method 400, a sparse mask generation engine 234 may generate 2D sparse instance segmentation masks 236 using at least a portion of the labeled 3D LiDAR data 218, in particular, the projected 3D LiDAR data points. In example embodiments, a respective 2D sparse instance segmentation mask may be generated for each object instance in a 2D camera image having 3D LiDAR data points projected thereon. An illustrative method for generating the 2D sparse instance segmentation masks will be described in more detail later in this disclosure in reference to FIG. 5.

At block 420 of the method 400, the 2D sparse instance segmentation masks 236 may be provided as input to a loss function 238 of the 2D instance segmentation model 232 during training of the model 232. More specifically, the 2D sparse instance segmentation masks 236 may be used to propagate loss during training of the 2D instance segmentation model 232. At block 422 of the method 400, a determination may be made as to whether the 2D instance segmentation model 232 has been trained to a desired accuracy level. In response to a positive determination at block 422, the method 400 may end. On the other hand, in response to a negative determination at block 422, the method 400 may proceed again from block 408, where 3D LiDAR data points may be projected onto another 2D camera image to be provided as additional input training data for training the 2D instance segmentation model 232.

FIG. 5 depicts an example method 500 for generating a 2D sparse segmentation mask in accordance with an example embodiment of the invention. The example method 500 illustrates a process flow for producing a particular 2D sparse segmentation mask for a particular object in a 2D image having 3D LiDAR data points projected thereon. It should be appreciated that the method 500 may be repeated to generate a 2D sparse segmentation mask for each object instance in a 2D camera image.

Referring now to FIG. 5 in conjunction with FIG. 2A, at block 502 of the method 500, the sparse mask generation engine 234 may select a previously unselected 3D LiDAR data point that has been projected into 2D space (e.g., projected onto the 2D camera image). At block 504 of the method 500, the sparse mask generation engine 234 may determine whether the selected 3D LiDAR data point is associated with a 3D label, that is, whether the selected 3D LiDAR data point is contained within a 3D bounding box in the labeled 3D data 218.

In response to a positive determination at block 504, the method 500 may proceed to block 506, where the sparse mask generation engine 234 may determine an object corresponding to the 3D label (e.g., the 3D bounding box). At block 508 of the method 500, the sparse mask generation engine 234 may determine whether the 2D sparse instance segmentation mask being generated corresponds to the object determined to correspond to the 3D label at block 506. In response to a positive determination at block 508, the method 500 may proceed to block 510, where the sparse mask generation engine 234 may assign a positive value (e.g., a binary ON value) in the 2D sparse instance segmentation mask to one or more pixels of the 2D camera image that contained the selected 3D LiDAR data point.

On the other hand, in response to a negative determination at block 508, the method 500 may proceed to block 512, where the sparse mask generation engine 234 may assign a negative value (e.g., a binary OFF value) in the 2D sparse instance segmentation mask to one or more pixels in the 2D camera image that contain the selected 3D LiDAR data point. Alternatively, the sparse mask generation engine 234 may assign the negative value to the pixel(s) containing the selected 3D LiDAR data point in response to a negative determination at block 504, which would indicate that the selected 3D LiDAR data point is not contained within any 3D bounding box in the labeled 3D data 218. This may be the case if the selected 3D LiDAR data point is not part of a cluster of data points dense enough to have been labeled with a 3D bounding box. Thus, in example embodiments, the negative value may be assigned at block 512 to the pixel(s) containing the selected 3D LiDAR data point if the selected 3D data point is not contained within any 3D bounding box or if the 3D bounding box that contains the selected 3D data point corresponds to a different object in the 2D image than the object for which the current 2D sparse instance segmentation mask is being generated.

Generally speaking, 3D bounding boxes corresponding to different objects will not have any region of overlap in 3D space. However, in certain example embodiments, there may be some overlap, in 3D space, between 3D bounding boxes corresponding to different objects if, for example, the objects are extremely close to one another. In such example embodiments, each 3D LiDAR data point within the region of overlap may be associated with a particular one of the 3D bounding boxes based on the application of rule-based criteria. For instance, each 3D LiDAR data point in a region of overlap between multiple 3D bounding boxes may be assigned/associated with the 3D bounding box whose center is closest to the 3D LiDAR data point. It should be appreciated that alternative and/or additional rule-based criteria may be applied as well.

Figure 3B:
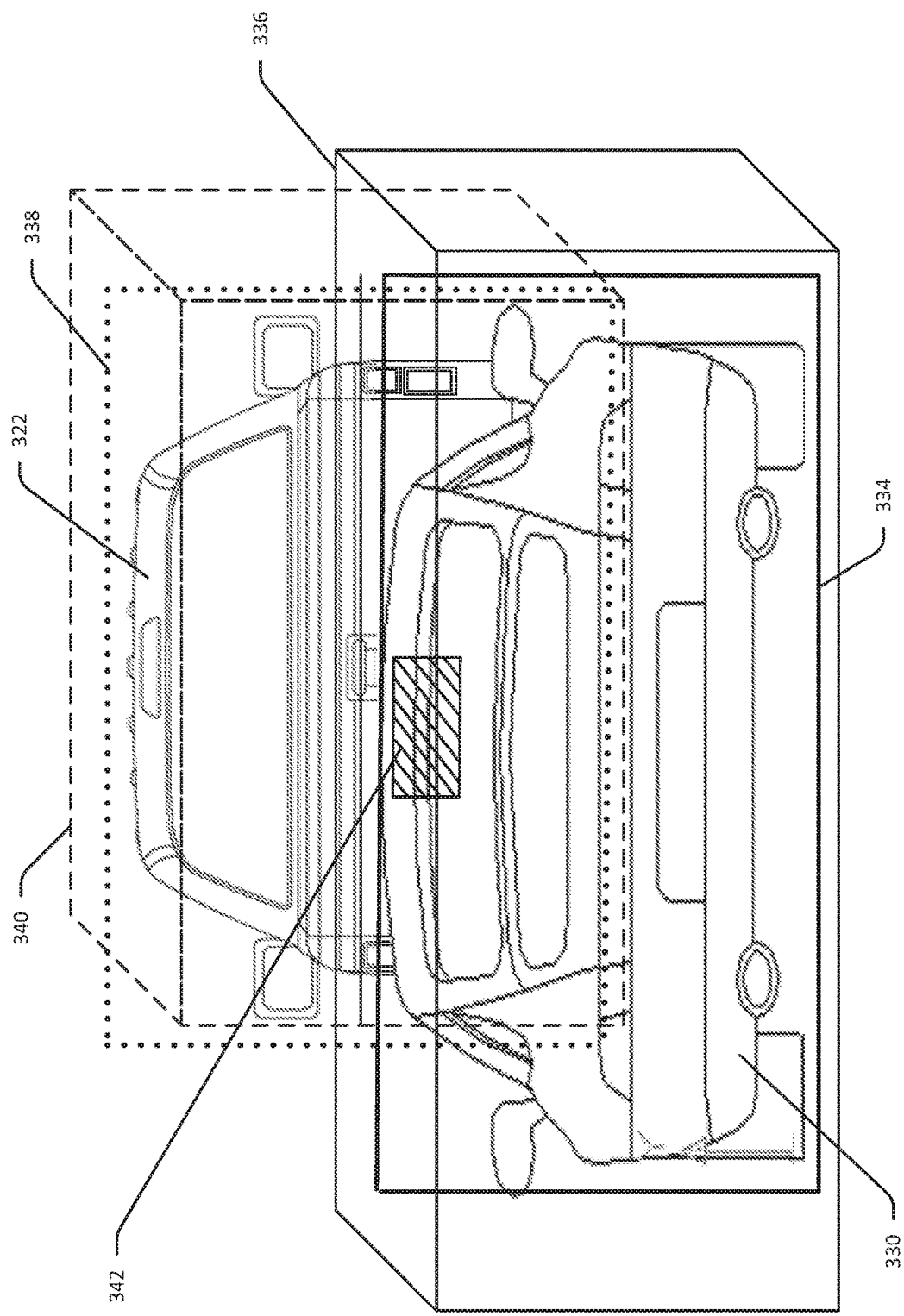
FIG. 3B illustrates use of labeled 3D point cloud data to generate 2D sparse instance segmentation masks from a 2D image having 3D point cloud data projected thereon in accordance with an example embodiment of the invention.

FIG. 3B illustrates use of labeled 3D point cloud data to generate 2D sparse instance segmentation masks from a 2D image having 3D point cloud data projected thereon in accordance with an example embodiment of the invention. As depicted in FIG. 3B, the example 2D camera image includes a first object 330 (e.g., a first vehicle) that partially obscures a second object 322 (e.g., a second vehicle). A 2D bounding box 334 is formed around the first object 330 and a 2D bounding box 338 is formed around the second object 322. In addition, a 3D bounding box 336 is formed around a set of 3D LiDAR point cloud data points (not shown for simplicity of depiction) corresponding to the first object 330 and projected onto the 2D camera image. Moreover, a 3D bounding box 340 is formed around a set of 3D LiDAR point cloud data points (not shown for simplicity of depiction) and projected onto the 2D camera image.

In example embodiments, 3D LiDAR data points which are contained within the 3D bounding box 336 would be associated with the first object 330, and thus, pixels of the 2D camera image that contain such projected 3D LiDAR data points would be assigned a positive (e.g., binary ON) value in a 2D sparse instance segmentation mask corresponding to the first object 330. Pixels of the 2D camera image that do not contain any such 3D LiDAR data points would be assigned a negative (e.g., a binary OFF value) in the 2D sparse instance segmentation mask for the first object 330. Similarly, 3D LiDAR data points which are contained within the 3D bounding box 340 would be associated with the second object 332, and thus, pixels of the 2D camera image that contain such projected 3D LiDAR data points would be assigned a positive (e.g., binary ON) value in a 2D sparse instance segmentation mask corresponding to the second object 332. Pixels of the 2D camera image that do not contain any such 3D LiDAR data points would be assigned a negative (e.g., a binary OFF value) in the 2D sparse instance segmentation mask for the second object 332.

While the 3D bounding box 336 that contains the first object 330 appears to be overlapping with the 3D bounding box 340 that contains the second object 322, the 3D bounding boxes 336, 340 generally would not overlap at all in 3D space. However, because the 3D LiDAR data points are projected into 2D space where there is no depth information, the 3D bounding boxes 336, 340 may appear to be overlapping in 2D space when in reality they are not. In some cases, however, there may some overlap between multiple 3D bounding boxes if, for example, the objects to which they correspond are extremely close to one another in physical space. For example, one or more projected 3D LiDAR data points (e.g., 3D data points that lie within the example region 342) may be contained within multiple 3D bounding boxes of the labeled 3D data 218. As previously noted, in such example scenarios, various rules-based criteria may be evaluated to associate any such projected 3D LiDAR data point with a particular one of the multiple 3D bounding boxes, and thus, a particular object instance, in which case, each pixel that contains such a data point may be assigned a positive value in the 2D sparse instance segmentation mask for that particular object instance and a negative value in each other 2D sparse instance segmentation mask corresponding to each other object instance in the 2D image.

Figure 2B:
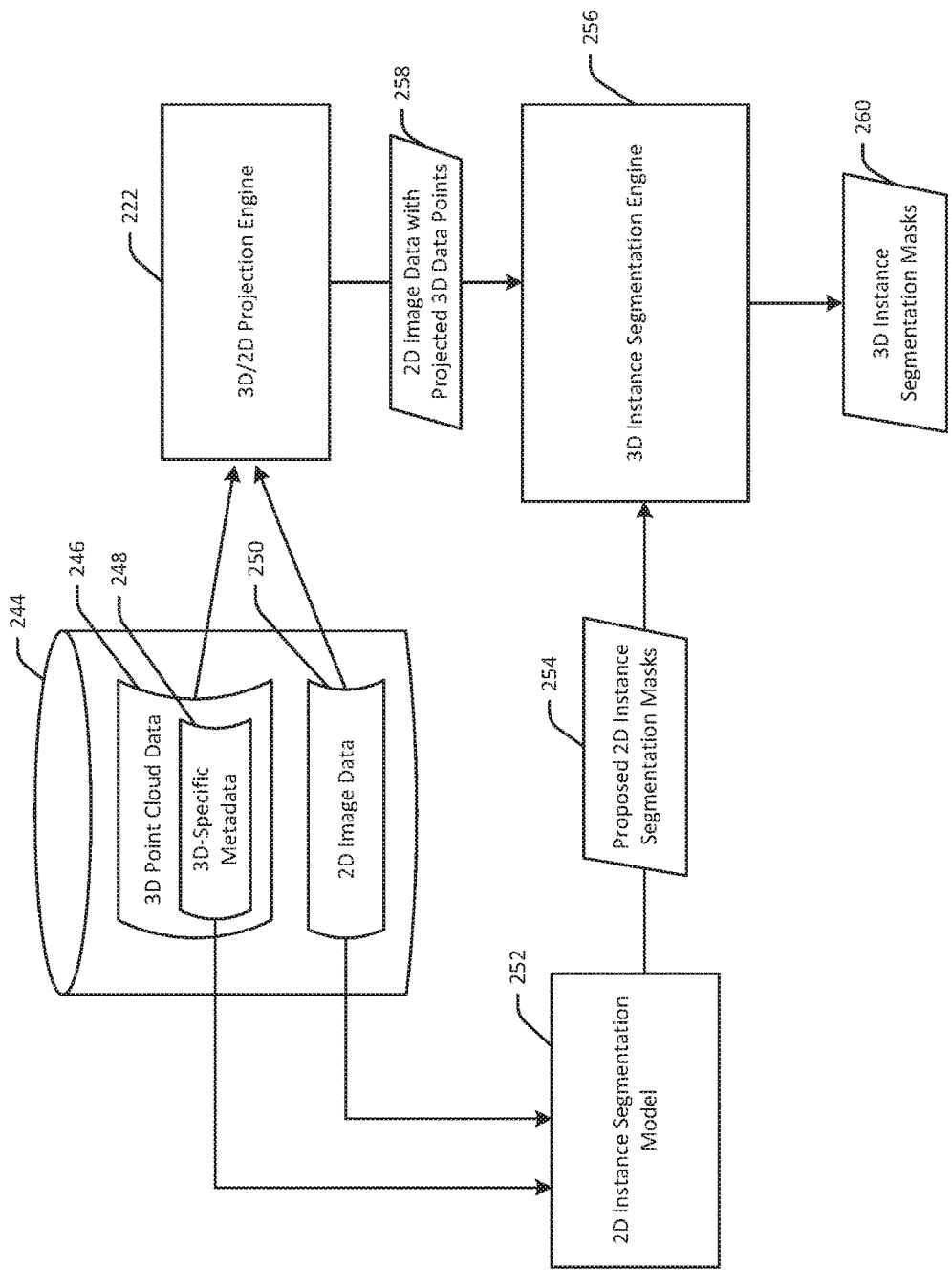
FIG. 2B is a hybrid data flow and block diagram illustrating use of the trained 2D instance segmentation model to perform three-dimensional (3D) instance segmentation in accordance with an example embodiment of the invention.
Figure 6:
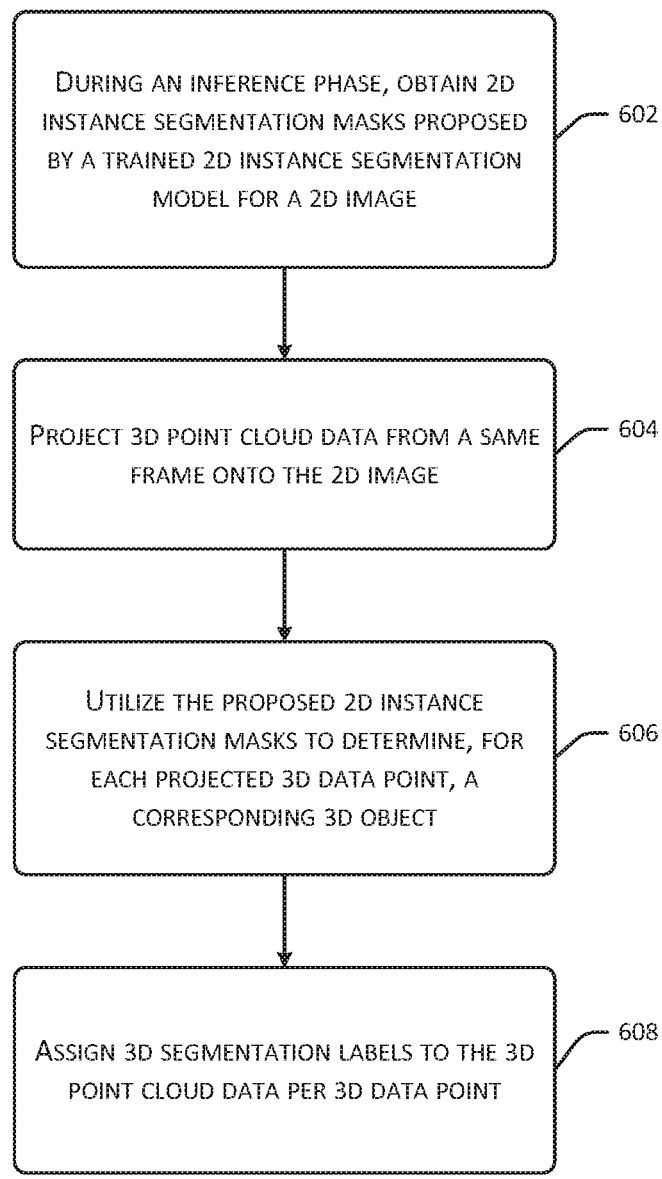
FIG. 6 is a process flow diagram of an illustrative method for utilizing the trained 2D instance segmentation model to perform 3D instance segmentation in accordance with an example embodiment of the invention.

FIG. 2B is a hybrid data flow and block diagram illustrating use of the trained 2D instance segmentation model to perform 3D instance segmentation in accordance with an example embodiment of the invention. FIG. 6 is a process flow diagram of an illustrative method 600 for utilizing the trained 2D instance segmentation model to perform 3D instance segmentation in accordance with an example embodiment of the invention. The example method 600 will be described hereinafter in conjunction with FIG. 2B.

Referring now to FIG. 6 in conjunction with FIG. 2B, at block 602 of the method 600, during an inference phase corresponding to the trained 2D instance segmentation model 252, a set of proposed 2D instance segmentation masks 254 may be obtained from the model 252. In particular, test 2D image data 250 (e.g., a test 2D camera image) may be provided to the model 252 as input, and the trained model 252 may output the set of proposed 2D instance segmentation masks 254 for the test 2D camera image. In addition, in certain example embodiments, 3D-specific metadata 248 associated with 3D LiDAR point cloud data 246 may also be provided as input to the model 252. As previously described, the 3D-specific metadata 248 may include, without limitation, depth values, intensity values, height values, etc. The 3D point cloud data 246, the 3D-specific metadata 248, and the 2D image data 250 may be stored in and retrieved from one or more datastores 244.

At block 604 of the method 600, the 3D/2D projection engine 222 may be executed to project the 3D point cloud data 246 onto the test 2D image data 260 to obtain 2D image data with projected 3D data points 258. More specifically, in example embodiments, the 3D/2D projection engine 222 may project a set of 3D LiDAR data points corresponding to a same frame as the test 2D camera image and within a FOV of the camera during capture of the 2D camera image onto the image to obtain the 2D camera image with projected 3D LiDAR data points 258.

At block 606 of the method 600, a 3D instance segmentation engine 256 may be executed to utilize the set of proposed 2D instance segmentation masks 254 to determine, for each projected 3D LiDAR data point, a corresponding 3D object. Finally, at block 608 of the method 600, the 3D instance segmentation engine 256 may assign a respective 3D segmentation label to each projected 3D LiDAR data point based on the corresponding 3D object, thereby producing 3D instance segmentation masks 260.

Hardware Implementation

Figure 7:
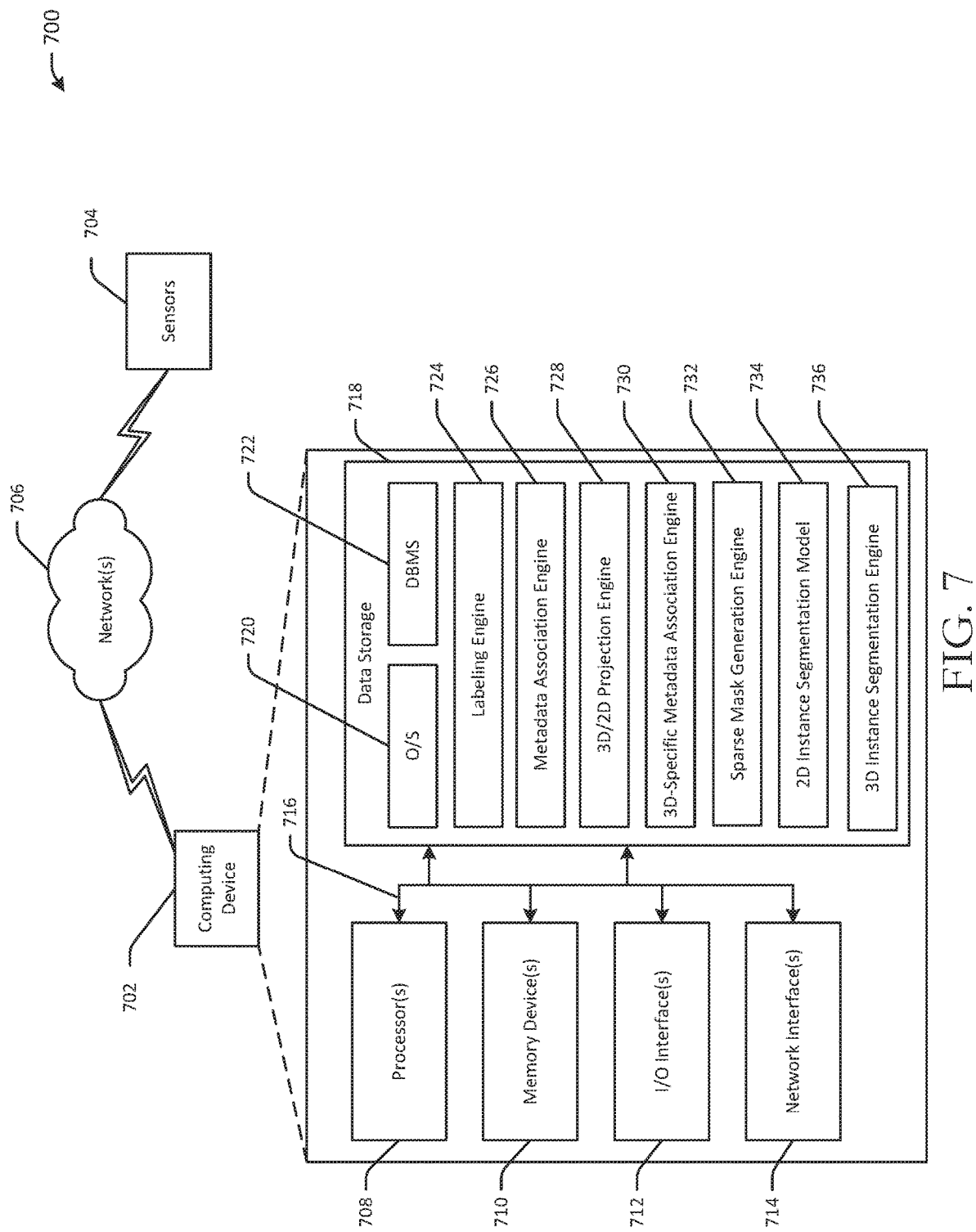
FIG. 7 is a schematic block diagram illustrating an example networked architecture configured to implement example embodiments of the invention.

FIG. 7 is a schematic block diagram illustrating an example networked architecture 600 configured to implement example embodiments of the invention. The networked architecture 600 can include one or more special-purpose computing devices 702 communicatively coupled via one or more networks 706 to various sensors 704. The sensors 704 may include any of the example types of on-board vehicle sensors previously described including, without limitation, LiDAR sensors, radars, cameras, GPS receivers, sonar-based sensors, ultrasonic sensors, IMUs, accelerometers, gyroscopes, magnetometers, FIR sensors, and so forth. In example embodiments, the sensors 704 may include on-board sensors provided on an exterior or in an interior of a vehicle such as an autonomous vehicle. The special-purpose computing device(s) 702 may include devices that are integrated with a vehicle and may receive sensor data from the sensors 704 via a local network connection (e.g., WiFi, Bluetooth, Dedicated Short Range Communication (DSRC), or the like). In other example embodiments, the special-purpose computing device(s) 702 may be provided remotely from a vehicle and may receive the sensor data from the sensors 704 via one or more long-range networks.

The special-purpose computing device(s) 702 may be hard-wired to perform the techniques; may include circuitry or digital electronic devices such as one or more ASICs or FPGAs that are persistently programmed to perform the techniques; and/or may include one or more hardware processors programmed to perform the techniques pursuant to program instructions in firmware, memory, other storage, or a combination thereof. The special-purpose computing device(s) 702 may also combine custom hard-wired logic, ASICs, or FPGAs with custom programming to accomplish the techniques. The special-purpose computing device(s) 702 may be desktop computer systems, server computer systems, portable computer systems, handheld devices, networking devices or any other device or combination of devices that incorporate hard-wired and/or programmed logic to implement the techniques.

The special-purpose computing device(s) may be generally controlled and coordinated by operating system software 720, such as iOS, Android, Chrome OS, Windows XP, Windows Vista, Windows 4, Windows 8, Windows Server, Windows CE, Unix, Linux, SunOS, Solaris, iOS, Blackberry OS, VxWorks, or other compatible operating systems. In other embodiments, the computing device(s) 702 may be controlled by a proprietary operating system. The operating system software 720 may control and schedule computer processes for execution; perform memory management; provide file system, networking, and I/O services; and provide user interface functionality, such as a graphical user interface ("GUI").

While the computing device(s) 702 and/or the sensors 704 may be described herein in the singular, it should be appreciated that multiple instances of any such component can be provided and functionality described in connection any particular component can be distributed across multiple instances of such a component. In certain example embodiments, functionality described herein in connection with any given component of the architecture 600 can be distributed among multiple components of the architecture 600. For example, at least a portion of functionality described as being provided by a computing device 702 may be distributed among multiple such computing devices 702.

The network(s) 706 can include, but are not limited to, any one or more different types of communications networks such as, for example, cable networks, public networks (e.g., the Internet), private networks (e.g., frame-relay networks), wireless networks, cellular networks, telephone networks (e.g., a public switched telephone network), or any other suitable private or public packet-switched or circuit-switched networks. The network(s) 706 can have any suitable communication range associated therewith and can include, for example, global networks (e.g., the Internet), metropolitan area networks (MANs), wide area networks (WANs), local area networks (LANs), or personal area networks (PANs). In addition, the network(s) 706 can include communication links and associated networking devices (e.g., link-layer switches, routers, etc.) for transmitting network traffic over any suitable type of medium including, but not limited to, coaxial cable, twisted-pair wire (e.g., twisted-pair copper wire), optical fiber, a hybrid fiber-coaxial (HFC) medium, a microwave medium, a radio frequency communication medium, a satellite communication medium, or any combination thereof.

In an illustrative configuration, the computing device 702 can include one or more processors (processor(s)) 708, one or more memory devices 710 (generically referred to herein as memory 710), one or more input/output ("I/O") interface(s) 712, one or more network interfaces 714, and data storage 718. The computing device 702 can further include one or more buses 718 that functionally couple various components of the computing device 702. The data storage may store one or more engines, program modules, components, or the like including, without limitation, a labeling engine 724, a metadata association engine 726, a 3D/2D projection engine 728, a 3D-specific metadata association engine 730, a sparse mask generation engine 732, a 2D instance segmentation model 734, and a 3D instance segmentation engine 736. Each of the engines/components depicted in FIG. 7 may include logic for performing any of the processes or tasks described earlier in connection with correspondingly named engines/components. In certain example embodiments, any of the depicted engines/components may be implemented in hard-wired circuitry within digital electronic devices such as one or more ASICs or FPGAs that are persistently programmed to perform corresponding techniques.

The bus(es) 718 can include at least one of a system bus, a memory bus, an address bus, or a message bus, and can permit the exchange of information (e.g., data (including computer-executable code), signaling, etc.) between various components of the computing device 702. The bus(es) 718 can include, without limitation, a memory bus or a memory controller, a peripheral bus, an accelerated graphics port, and so forth. The bus(es) 718 can be associated with any suitable bus architecture including, without limitation, an Industry Standard Architecture (ISA), a Micro Channel Architecture (MCA), an Enhanced ISA (EISA), a Video Electronics Standards Association (VESA) architecture, an Accelerated Graphics Port (AGP) architecture, a Peripheral Component Interconnects (PCI) architecture, a PCI-Express architecture, a Personal Computer Memory Card International Association (PCMCIA) architecture, a Universal Serial Bus (USB) architecture, and so forth.

The memory 710 can include volatile memory (memory that maintains its state when supplied with power) such as random access memory (RAM) and/or non-volatile memory (memory that maintains its state even when not supplied with power) such as read-only memory (ROM), flash memory, ferroelectric RAM (FRAM), and so forth. Persistent data storage, as that term is used herein, can include non-volatile memory. In certain example embodiments, volatile memory can enable faster read/write access than non-volatile memory. However, in certain other example embodiments, certain types of non-volatile memory (e.g., FRAM) can enable faster read/write access than certain types of volatile memory.

In various implementations, the memory 710 can include multiple different types of memory such as various types of static random access memory (SRAM), various types of dynamic random access memory (DRAM), various types of unalterable ROM, and/or writeable variants of ROM such as electrically erasable programmable read-only memory (EEPROM), flash memory, and so forth. The memory 710 can include main memory as well as various forms of cache memory such as instruction cache(s), data cache(s), translation lookaside buffer(s) (TLBs), and so forth. Further, cache memory such as a data cache can be a multi-level cache organized as a hierarchy of one or more cache levels (L1, L2, etc.).

The data storage 718 can include removable storage and/or non-removable storage including, but not limited to, magnetic storage, optical disk storage, and/or tape storage. The data storage 718 can provide non-volatile storage of computer-executable instructions and other data. The memory 710 and the data storage 718, removable and/or non-removable, are examples of computer-readable storage media (CRSM) as that term is used herein. The data storage 718 can store computer-executable code, instructions, or the like that can be loadable into the memory 710 and executable by the processor(s) 708 to cause the processor(s) 708 to perform or initiate various operations. The data storage 718 can additionally store data that can be copied to memory 710 for use by the processor(s) 708 during the execution of the computer-executable instructions. Moreover, output data generated as a result of execution of the computer-executable instructions by the processor(s) 708 can be stored initially in memory 710 and can ultimately be copied to data storage 718 for non-volatile storage.

More specifically, the data storage 718 can store one or more operating systems (O/S) 720 and one or more database management systems (DBMS) 722 configured to access the memory 710 and/or one or more external datastore(s) (not depicted) potentially via one or more of the networks 706. In addition, the data storage 718 may further store one or more program modules, applications, engines, computer-executable code, scripts, or the like. For instance, any of the engines/components depicted in FIG. 7 may be implemented as software and/or firmware that includes computer-executable instructions (e.g., computer-executable program code) loadable into the memory 710 for execution by one or more of the processor(s) 708 to perform any of the techniques described herein.

Although not depicted in FIG. 7, the data storage 718 can further store various types of data utilized by engines/components of the computing device 702. Such data may include, without limitation, 2D/3D sensor data, 2D sparse instance segmentation masks, 2D image data with projected 3D point cloud data points, 3D-specific metadata, or the like. Any data stored in the data storage 718 can be loaded into the memory 710 for use by the processor(s) 708 in executing computer-executable program code. In addition, any data stored in the data storage 718 can potentially be stored in one or more external datastores (e.g., the datastore(s) 244) that are accessible via the DBMS 722 and loadable into the memory 710 for use by the processor(s) 708 in executing computer-executable instructions/program code.

The processor(s) 708 can be configured to access the memory 710 and execute computer-executable instructions/program code loaded therein. For example, the processor(s) 708 can be configured to execute computer-executable instructions/program code of the various engines/components of the FOV semantics computing machine 724 to cause or facilitate various operations to be performed in accordance with one or more embodiments of the invention. The processor(s) 708 can include any suitable processing unit capable of accepting data as input, processing the input data in accordance with stored computer-executable instructions, and generating output data. The processor(s) 708 can include any type of suitable processing unit including, but not limited to, a central processing unit, a microprocessor, a Reduced Instruction Set Computer (RISC) microprocessor, a Complex Instruction Set Computer (CISC) microprocessor, a microcontroller, an Application Specific Integrated Circuit (ASIC), a Field-Programmable Gate Array (FPGA), a System-on-a-Chip (SoC), a digital signal processor (DSP), and so forth. Further, the processor(s) 708 can have any suitable microarchitecture design that includes any number of constituent components such as, for example, registers, multiplexers, arithmetic logic units, cache controllers for controlling read/write operations to cache memory, branch predictors, or the like. The microarchitecture design of the processor(s) 708 can be made capable of supporting any of a variety of instruction sets.

Referring now to other illustrative components depicted as being stored in the data storage 718, the O/S 720 can be loaded from the data storage 718 into the memory 710 and can provide an interface between other application software executing on the computing device 702 and hardware resources of the computing device 702. More specifically, the O/S 720 can include a set of computer-executable instructions for managing hardware resources of the computing device 702 and for providing common services to other application programs. In certain example embodiments, the O/S 720 can include or otherwise control execution of one or more of the engines/program modules stored in the data storage 718. The O/S 720 can include any operating system now known or which can be developed in the future including, but not limited to, any server operating system, any mainframe operating system, or any other proprietary or non-proprietary operating system.

The DBMS 722 can be loaded into the memory 710 and can support functionality for accessing, retrieving, storing, and/or manipulating data stored in the memory 710, data stored in the data storage 718, and/or data stored in external datastore(s). The DBMS 722 can use any of a variety of database models (e.g., relational model, object model, etc.) and can support any of a variety of query languages. The DBMS 722 can access data represented in one or more data schemas and stored in any suitable data repository. Datastore(s) that may be accessible by the computing device 702 via the DBMS 722, can include, but are not limited to, databases (e.g., relational, object-oriented, etc.), file systems, flat files, distributed datastores in which data is stored on more than one node of a computer network, peer-to-peer network datastores, or the like.

Referring now to other illustrative components of the computing device 702, the input/output (I/O) interface(s) 712 can facilitate the receipt of input information by the computing device 702 from one or more I/O devices as well as the output of information from the computing device 702 to the one or more I/O devices. The I/O devices can include any of a variety of components such as a display or display screen having a touch surface or touchscreen; an audio output device for producing sound, such as a speaker; an audio capture device, such as a microphone; an image and/or video capture device, such as a camera; a haptic unit; and so forth. Any of these components can be integrated into the computing device 702 or can be separate therefrom. The I/O devices can further include, for example, any number of peripheral devices such as data storage devices, printing devices, and so forth.

The I/O interface(s) 712 can also include an interface for an external peripheral device connection such as universal serial bus (USB), FireWire, Thunderbolt, Ethernet port or other connection protocol that can connect to one or more networks. The I/O interface(s) 712 can also include a connection to one or more antennas to connect to one or more networks via a wireless local area network (WLAN) (such as Wi-Fi) radio, Bluetooth, and/or a wireless network radio, such as a radio capable of communication with a wireless communication network such as a Long Term Evolution (LTE) network, WiMAX network, 3G network, etc.

The computing device 702 can further include one or more network interfaces 714 via which the computing device 702 can communicate with any of a variety of other systems, platforms, networks, devices, and so forth. The network interface(s) 714 can enable communication, for example, with the sensors 704 and/or one or more other devices via one or more of the network(s) 706. In example embodiments, the network interface(s) 714 provide a two-way data communication coupling to one or more network links that are connected to one or more of the network(s) 706. For example, the network interface(s) 714 may include an integrated services digital network (ISDN) card, a cable modem, a satellite modem, or a modem to provide a data communication connection to a corresponding type of telephone line. As another non-limiting example, the network interface(s) 714 may include a local area network (LAN) card to provide a data communication connection to a compatible LAN (or a wide area network (WAN) component to communicate with a WAN). Wireless links may also be implemented. In any such implementation, the network interface(s) 714 may send and receive electrical, electromagnetic, or optical signals that carry digital data streams representing various types of information.

A network link typically provides data communication through one or more networks to other data devices. For example, a network link may provide a connection through a local network to a host computer or to data equipment operated by an Internet Service Provider (ISP). The ISP, in turn, may provide data communication services through the world wide packet data communication network now commonly referred to as the "Internet". Local networks and the Internet both use electrical, electromagnetic, or optical signals that carry digital data streams. The signals through the various network(s) 704 and the signals on network links and through the network interface(s) 714, which carry the digital data to and from the computing device 702, are example forms of transmission media. In example embodiments, the computing device 702 can send messages and receive data, including program code, through the network(s) 706, network links, and network interface(s) 714. For instance, in the Internet example, a server might transmit a requested code for an application program through the Internet, the ISP, a local network, and a network interface 714. The received code may be executed by a processor 708 as it is received, and/or stored in the data storage 718, or other non-volatile storage for later execution.

It should be appreciated that the engines depicted in FIG. 7 as part of the computing device 702 are merely illustrative and not exhaustive. In particular, functionality can be modularized in any suitable manner such that processing described as being supported by any particular engine can alternatively be distributed across multiple engines, program modules, components, or the like, or performed by a different engine, program module, component, or the like. Further, one or more depicted engines may or may not be present in certain embodiments, while in other embodiments, additional engines not depicted can be present and can support at least a portion of the described functionality and/or additional functionality. In addition, various engine(s), program module(s), script(s), plug-in(s), Application Programming Interface(s) (API(s)), or any other suitable computer-executable code hosted locally on the computing device 702 and/or hosted on other computing device(s) (e.g., 702) accessible via one or more of the network(s) 702, can be provided to support functionality provided by the engines depicted in FIG. 7 and/or additional or alternate functionality. In addition, engines that support functionality described herein can be implemented, at least partially, in hardware and/or firmware and can be executable across any number of computing devices 702 in accordance with any suitable computing model such as, for example, a client-server model, a peer-to-peer model, and so forth.

It should further be appreciated that the computing device 702 can include alternate and/or additional hardware, software, and/or firmware components beyond those described or depicted without departing from the scope of the invention. More particularly, it should be appreciated that software, firmware, and/or hardware components depicted as forming part of the computing device 702 are merely illustrative and that some components may or may not be present or additional components may be provided in various embodiments. It should further be appreciated that each of the engines depicted and described represent, in various embodiments, a logical partitioning of supported functionality. This logical partitioning is depicted for ease of explanation of the functionality and may or may not be representative of the structure of software, hardware, and/or firmware for implementing the functionality.

In general, the terms engine, program module, or the like, as used herein, refer to logic embodied in hardware, firmware, and/or circuitry, or to a collection of software instructions, possibly having entry and exit points, written in a programming language, such as, for example, Java, C or C++. A software engine/module may be compiled and linked into an executable program, installed in a dynamic link library, or may be written in an interpreted programming language such as, for example, BASIC, Perl, or Python. It will be appreciated that software engines/modules may be callable from other engines/modules or from themselves, and/or may be invoked in response to detected events or interrupts. Software engines/modules configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. "Open source" software refers to source code that can be distributed as source code and/or in compiled form, with a well-publicized and indexed means of obtaining the source, and optionally with a license that allows modifications and derived works. Software instructions may be embedded in firmware and stored, for example, on flash memory such as erasable programmable read-only memory (EPROM). It will be further appreciated that hardware modules/engines may include connected logic units, such as gates and flip-flops, and/or may be further include programmable units, such as programmable gate arrays or processors.

Example embodiments are described herein as including engines or program modules. Such engines/program modules may constitute either software engines (e.g., code embodied on a machine-readable medium) or hardware engines. A "hardware engine" is a tangible unit capable of performing certain operations and may be configured or arranged in a certain physical manner. In various example embodiments, one or more computer systems (e.g., a standalone computer system, a client computer system, or a server computer system) or one or more hardware engines of a computer system (e.g., a processor or a group of processors) may be configured by software (e.g., an application or application portion) as a hardware engine that operates to perform certain operations as described herein.

In some embodiments, a hardware engine may be implemented mechanically, electronically, or any suitable combination thereof. For example, a hardware engine may include dedicated circuitry or logic that is permanently configured to perform certain operations. For example, a hardware engine may be a special-purpose processor, such as a field programmable gate array (FPGA) or an application specific integrated circuit (ASIC). A hardware engine may also include programmable logic or circuitry that is temporarily configured by software to perform certain operations. For example, a hardware engine may include a general-purpose processor or other programmable processor configured by software, in which case, the configured processor becomes a specific machine uniquely tailored to perform the configured functions and no longer constitute general-purpose processors. It will be appreciated that the decision to implement a hardware engine mechanically, in dedicated and permanently configured circuitry, or in temporarily configured circuitry (e.g., configured by software) may be driven by cost and time considerations.

Accordingly, the term "engine" or "program module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware engines are temporarily configured (e.g., programmed), each of the hardware engines need not be configured or instantiated at any one instance in time. For example, where a hardware engine includes a general-purpose processor configured by software to become a special-purpose processor, the general-purpose processor may be configured as respectively different special-purpose processors (e.g., comprising different hardware engines) at different times. Software accordingly can configure a particular processor or processors, for example, to constitute a particular hardware engine at a given instance of time and to constitute a different hardware engine at a different instance of time.

Hardware engines can provide information to, and receive information from, other hardware engines. Accordingly, the described hardware engines may be regarded as being communicatively coupled. Where multiple hardware engines exist contemporaneously, communications may be achieved through signal transmission (e.g., over appropriate circuits and buses) between or among two or more of the hardware engines. In embodiments in which multiple hardware engines are configured or instantiated at different times, communications between such hardware engines may be achieved, for example, through the storage and retrieval of information in memory structures to which the multiple hardware engines have access. For example, one hardware engine may perform an operation and store the output of that operation in a memory device to which it is communicatively coupled. A further hardware engine may then, at a later time, access the memory device to retrieve and process the stored output. Hardware engines may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute an implementation of a hardware engine. Similarly, the methods described herein may be at least partially processor-implemented, with a particular processor or processors being an example of hardware. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API).

The performance of certain of the operations of example methods described herein may be distributed among multiple processors, not only residing within a single machine, but deployed across a number of machines. In some example embodiments, the processors may be located in a single geographic location (e.g., within a home environment, an office environment, or a server farm). In other example embodiments, the processors may be distributed across a number of geographic locations.

The present invention may be implemented as a system, a method, and/or a computer program product. The computer program product may include a computer readable storage medium (or media) having computer readable program instructions embodied thereon for causing a processor to carry out aspects of the present invention.

The computer readable storage medium is a form of non-transitory media, as that term is used herein, and can be any tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. The computer readable storage medium, and non-transitory media more generally, may include non-volatile media and/or volatile media. A non-exhaustive list of more specific examples of a computer readable storage medium includes the following: a portable computer diskette such as a floppy disk or a flexible disk; a hard disk; a random access memory (RAM), a read-only memory (ROM), an erasable programmable read-only memory (EPROM or Flash memory), a static random access memory (SRAM), or any other memory chip or cartridge; a portable compact disc read-only memory (CD-ROM); a digital versatile disk (DVD); a memory stick; a solid state drive; magnetic tape or any other magnetic data storage medium; a mechanically encoded device such as punch-cards or raised structures in a groove having instructions recorded thereon or any physical medium with patterns of holes; any networked versions of the same; and any suitable combination of the foregoing.

Non-transitory media is distinct from transmission media, and thus, a computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire. Non-transitory media, however, can operate in conjunction with transmission media. In particular, transmission media may participate in transferring information between non-transitory media. For example, transmission media can include coaxial cables, copper wire, and/or fiber optics, including the wires that include at least some of the bus(es) 702. Transmission media can also take the form of acoustic or light waves, such as those generated during radio-wave and infra-red data communications.

Computer readable program instructions described herein can be downloaded to respective computing/processing devices from a computer readable storage medium or to an external computer or external storage device via a network, for example, the Internet, a local area network (LAN), a wide area network (WAN), and/or a wireless network. The network may include copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or a WAN, or the connection may be made to an external computer (for example, through the Internet using an Internet Service Provider (ISP)). In some embodiments, electronic circuitry including, for example, programmable logic circuitry, FPGAs, or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks. The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The various features and processes described above may be used independently of one another or may be combined in various ways. All possible combinations and sub-combinations are intended to fall within the scope of the invention. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

The flowchart and block diagrams in the Figures illustrate the architecture, functionality, and operation of possible implementations of systems, methods, and computer program products according to various embodiments of the invention. In this regard, each block in the flowchart or block diagrams may represent a module, segment, or portion of instructions, which includes one or more executable instructions for implementing the specified logical function(s). In some alternative implementations, the functions noted in the block may occur out of the order noted in the figures. For example, two blocks shown in succession may, in fact, be executed partially, substantially, or entirely concurrently, or the blocks may sometimes be executed in the reverse order, depending upon the functionality involved.

It should be emphasized that many variations and modifications may be made to the above-described embodiments, the elements of which are to be understood as being among other example embodiments of the invention. All such modifications and variations are intended to be included herein within the scope of the invention. While example embodiments of the invention may be referred to herein, individually or collectively, by the term "invention," this is merely for convenience and does not limit the scope of the invention to any single disclosure or concept if more than one is, in fact, disclosed. The foregoing description details certain embodiments of the invention. It will be appreciated, however, that no matter how detailed the foregoing appears in text, the invention can be practiced in many ways. It should be noted that the use of particular terminology when describing certain features or aspects of the invention should not be taken to imply that the terminology is being redefined herein to be restricted to including any specific characteristics of the features or aspects of the invention with which that terminology is associated.

The embodiments illustrated herein are described in sufficient detail to enable those skilled in the art to practice the teachings disclosed. Other embodiments may be used and derived therefrom, such that structural and logical substitutions and changes may be made without departing from the scope of the invention. The Detailed Description, therefore, is not to be taken in a limiting sense, and the scope of various embodiments is defined only by the appended claims, along with the full range of equivalents to which such claims are entitled.

Although the invention(s) have been described in detail for the purpose of illustration based on what is currently considered to be the most practical and preferred implementations, it is to be understood that such detail is solely for that purpose and that the invention is not limited to the disclosed implementations, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

As used herein, the term "or" may be construed in either an inclusive or exclusive sense. Moreover, plural instances may be provided for resources, operations, or structures described herein as a single instance. Additionally, boundaries between various resources, operations, program modules, engines, and/or datastores are somewhat arbitrary, and particular operations are illustrated in a context of specific illustrative configurations. Other allocations of functionality are envisioned and may fall within a scope of various embodiments of the invention. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the invention as represented by the appended claims. The specification and drawings are, accordingly, to be regarded in an illustrative rather than a restrictive sense.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment. In addition, it should be appreciated that any operation, element, component, data, or the like described herein as being based on another operation, element, component, data, or the like can be additionally based on one or more other operations, elements, components, data, or the like. Accordingly, the phrase "based on," or variants thereof, should be interpreted as "based at least in part on."

What is claimed is:

1. A computer-implemented method for training an instance segmentation model using sensor data having different dimensionalities, the method comprising:
   capturing first sensor data having a first dimensionality using a first sensor and second sensor data having a second dimensionality using a second sensor;

assigning a first set of labels to the first sensor data to obtain labeled first sensor data and a second set of labels to the second sensor data to obtain labeled second sensor data;

projecting the first sensor data onto the second sensor data to obtain training data;

providing the training data as input to the instance segmentation model;

generating, based at least in part on the training data and the first set of labels, a set of sparse instance segmentation masks having the second dimensionality; and utilizing the set of sparse instance segmentation masks to perform loss propagation during training of the instance segmentation model.

2. The computer-implemented method of claim 1, wherein the first sensor data is three-dimensional (3D) point cloud data and the second sensor data is two-dimensional (2D) image data.

3. The computer-implemented method of claim 2, wherein assigning the first set of labels to the first sensor data comprises applying 3D bounding boxes to the 3D point cloud data, and wherein assigning the second set of labels to the second sensor data comprises applying 2D bounding boxes to the 2D image data.

4. The computer-implemented method of claim 2, wherein the first sensor is a light detection and ranging (LiDAR) sensor and the second sensor is a camera, and wherein projecting the first sensor data onto the second sensor data to obtain the training data comprises:

determining a set of 3D point cloud data points captured by the LiDAR during a same frame as a 2D image of the 2D image data is captured by the camera;

determining at least a subset of the 3D point cloud data points within a field-of-view (FOV) of the camera; and projecting the at least a subset of the 3D point cloud data points onto the 2D image to obtain at least a portion of the training data.

5. The computer-implemented method of claim 4, further comprising:

determining a set of extrinsics between the LiDAR and the camera, the set of extrinsics comprising rotational and translational information between a location of the LiDAR and a location of the camera, wherein determining the at least a subset of the 3D point cloud data points within the FOV of the camera comprises determining the at least a subset of the 3D point cloud data points based at least in part on the set of extrinsics.

6. The computer-implemented method of claim 4, further comprising:

identifying LiDAR-specific metadata associated with the projected 3D point cloud data points; and associating the LiDAR-specific metadata with the training data, wherein providing the training data as input to the instance segmentation model comprises providing the training data having the LiDAR-specific metadata associated therewith as input to the instance segmentation model.

7. The computer-implemented method of claim 6, wherein the LiDAR-specific metadata comprises a respective at least one of a depth value, intensity value, or height value associated with each of one or more of the projected 3D point cloud data points.

8. The computer-implemented method of claim 4, wherein the set of sparse instance segmentation masks is a set of 2D sparse instance segmentation masks, and wherein determining the set of 2D sparse instance segmentation masks comprises:

selecting a first projected 3D point cloud data point;

determining that the first projected 3D point cloud data point is associated with a first 3D label of the first set of labels;

determining a first object corresponding to the first 3D label;

determining that a particular 2D sparse instance segmentation mask being generated corresponds to the first object; and associating a respective positive value with each of one or more pixels in the 2D image that contain the first projected 3D point cloud data point.

9. The computer-implemented method of claim 8, further comprising:

selecting a second projected 3D point cloud data point;

determining that the second projected 3D point cloud data point is not associated with a 3D label in the first set of labels or determining that the second projected 3D point cloud data point is associated with a second 3D label in the first set of labels that corresponds to a second object that does not correspond to the particular 2D sparse instance segmentation mask being generated; and associating a respective negative value with each of one or more pixels in the 2D image that contain the second projected 3D point cloud data point.

10. The computer-implemented method of claim 2, wherein the 3D point cloud data is first 3D point cloud data and the 2D image data is first 2D image data, the method further comprising:

applying the trained 2D instance segmentation model to second 2D image data to obtain a set of one or more proposed 2D instance segmentation masks;

projecting second 3D point cloud data associated with a same frame as the second 2D image data onto the second 2D image data;

utilizing the set of one or more proposed 2D instance segmentation masks to determine a respective 3D object corresponding to each projected 3D data point of the second 3D point cloud data; and assigning a respective 3D segmentation label to each projected 3D data point based on the respective corresponding 3D object.

11. A system for training an instance segmentation model using sensor data having different dimensionalities, the system comprising:

at least one processor; and at least one memory storing computer-executable instructions, wherein the at least one processor is configured to access the at least one memory and execute the computer-executable instructions to:

capture first sensor data having a first dimensionality using a first sensor and second sensor data having a second dimensionality using a second sensor;

assign a first set of labels to the first sensor data to obtain labeled first sensor data and a second set of labels to the second sensor data to obtain labeled second sensor data;

project the first sensor data onto the second sensor data to obtain training data;

provide the training data as input to the instance segmentation model;

generate, based at least in part on the training data and the first set of labels, a set of sparse instance segmentation masks having the second dimensionality; and utilize the set of sparse instance segmentation masks to perform loss propagation during training of the instance segmentation model.

12. The system of claim 11, wherein the first sensor data is three-dimensional (3D) point cloud data and the second sensor data is two-dimensional (2D) image data.

13. The system of claim 12, wherein the at least one processor is configured to assign the first set of labels to the first sensor data by executing the computer-executable instructions to assign 3D bounding boxes to the 3D point cloud data, and wherein the at least one processor is configured to assign the second set of labels to the second sensor data by executing the computer-executable instructions to apply 2D bounding boxes to the 2D image data.

14. The system of claim 12, wherein the first sensor is a light detection and ranging (LiDAR) sensor and the second sensor is a camera, and wherein the at least one processor is configured to project the first sensor data onto the second sensor data to obtain the training data by executing the computer-executable instructions to:

determine a set of 3D point cloud data points captured by the LiDAR during a same frame as a 2D image of the 2D image data is captured by the camera;

determine at least a subset of the 3D point cloud data points within a field-of-view (FOV) of the camera; and project the at least a subset of the 3D point cloud data points onto the 2D image to obtain at least a portion of the training data.

15. The system of claim 14, wherein the at least one processor is further configured to execute the computer-executable instructions to:

determine a set of extrinsics between the LiDAR and the camera, the set of extrinsics comprising rotational and translational information between a location of the LiDAR and a location of the camera, wherein the at least one processor is configured to determine the at least a subset of the 3D point cloud data points within the FOV of the camera by executing the computer-executable instructions to determine the at least a subset of the 3D point cloud data points based at least in part on the set of extrinsics.

16. The system of claim 14, wherein the at least one processor is further configured to execute the computer-executable instructions to:

identify LiDAR-specific metadata associated with the projected 3D point cloud data points; and associate the LiDAR-specific metadata with the training data, wherein the at least one processor is configured to provide the training data as input to the instance segmentation model by executing the computer-executable instructions to provide the training data having the LiDAR-specific metadata associated therewith as input to the instance segmentation model.

17. The system of claim 16, wherein the LiDAR-specific metadata comprises a respective at least one of a depth value, intensity value, or height value associated with each of one or more of the projected 3D point cloud data points.

18. The system of claim 14, wherein the set of sparse instance segmentation masks is a set of 2D sparse instance segmentation masks, and wherein the at least one processor is configured to determine the set of 2D sparse instance segmentation masks by executing the computer-executable instructions to:

select a first projected 3D point cloud data point;

determine that the first projected 3D point cloud data point is associated with a first 3D label of the first set of labels;

determine a first object corresponding to the first 3D label;

determine that a particular 2D sparse instance segmentation mask being generated corresponds to the first object; and associate a respective positive value with each of one or more pixels in the 2D image that contain the first projected 3D point cloud data point.

19. The system of claim 18, wherein the at least one processor is further configured to execute the computer-executable instructions to:

select a second projected 3D point cloud data point;

determine that the second projected 3D point cloud data point is not associated with a 3D label in the first set of labels or determine that the second projected 3D point cloud data point is associated with a second 3D label in the first set of labels that corresponds to a second object that does not correspond to the particular 2D sparse instance segmentation mask being generated; and associate a respective negative value with each of one or more pixels in the 2D image that contain the second projected 3D point cloud data point.

20. The system of claim 12, wherein the 3D point cloud data is first 3D point cloud data and the 2D image data is first 2D image data, and wherein the at least one processor is further configured to execute the computer-executable instructions to:

apply the trained 2D instance segmentation model to second 2D image data to obtain a set of one or more proposed 2D instance segmentation masks;

project second 3D point cloud data associated with a same frame as the second 2D image data onto the second 2D image data;

utilize the set of one or more proposed 2D instance segmentation masks to determine a respective 3D object corresponding to each projected 3D data point of the second 3D point cloud data; and assign a respective 3D segmentation label to each projected 3D data point based on the respective corresponding 3D object.

* * * * *